US012142208B2

(12) United States Patent
Wang

(10) Patent No.: US 12,142,208 B2
(45) Date of Patent: Nov. 12, 2024

(54) PIXEL DRIVE CIRCUIT, DRIVING METHOD THEREOF AND DISPLAY PANEL

(71) Applicants: Chengdu BOE Optoelectronics Technology Co., Ltd., Chengdu (CN); BOE TECHNOLOGY GROUP CO., LTD., Beijing (CN)

(72) Inventor: Zhu Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 124 days.

(21) Appl. No.: 17/438,448

(22) PCT Filed: Nov. 30, 2020

(86) PCT No.: PCT/CN2020/132866

§ 371 (c)(1),
(2) Date: Sep. 12, 2021

(87) PCT Pub. No.: WO2022/110179

PCT Pub. Date: Jun. 2, 2022

(65) Prior Publication Data

US 2023/0110045 A1 Apr. 13, 2023

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0426* (2013.01);
(Continued)

(58) Field of Classification Search
None
See application file for complete search history.

(56) References Cited

U.S. PATENT DOCUMENTS 9,626,905 B2 4/2017 In et al.
10,923,506 B2 2/2021 Park
(Continued)

FOREIGN PATENT DOCUMENTS

CN 109216414 A 1/2019
CN 109817165 A 5/2019
(Continued)

OTHER PUBLICATIONS

Written Opinion for International Application No. PCT/CN2020/132866 mailed Sep. 8, 2021.
(Continued)

*Primary Examiner* — Nitin Patel
*Assistant Examiner* — Amen W Bogale
(74) *Attorney, Agent, or Firm* — Perilla Knox & Hildebrandt LLP; Kenneth A. Knox

(57) ABSTRACT

A pixel drive circuit, a driving method thereof, and a display panel are provided. The pixel drive circuit comprises a drive transistor, a data writing circuit, a compensation circuit, a light-emitting control circuit, a storage circuit, a first transistor and a second transistor. The first electrode of the drive transistor is connected to the first node, the second electrode thereof is connected to the second node, and the gate thereof is connected to the third node; the data writing circuit is connected to the first node and the data signal terminal; the compensation circuit is connected to the second node and the third node; the light-emitting control circuit is connected to the drive transistor, the first power supply terminal, the light-emitting unit and the enable signal terminal; the storage circuit is connected between the first power supply terminal and the third node.

20 Claims, 19 Drawing Sheets

(52) U.S. Cl.
CPC ............... *G09G 2300/0842* (2013.01); *G09G 2310/061* (2013.01)

(56) References Cited

U.S. PATENT DOCUMENTS

| | | | | |
|---|---|---|---|---|
| 2015/0348464 | A1 | 12/2015 | In et al. | |
| 2016/0203794 | A1 | 7/2016 | Lim et al. | |
| 2016/0321995 | A1 | 11/2016 | Shin | |
| 2017/0243542 | A1* | 8/2017 | Xiang | G09G 3/3291 |
| 2018/0190185 | A1* | 7/2018 | Ko | G09G 3/3233 |
| 2018/0197474 | A1* | 7/2018 | Jeon | G09G 3/3233 |
| 2019/0006390 | A1 | 1/2019 | Park | |
| 2020/0013338 | A1 | 1/2020 | Kang et al. | |
| 2021/0249495 | A1* | 8/2021 | Lee | G06F 3/0412 |
| 2022/0059637 | A1* | 2/2022 | Choi | G09G 3/3233 |
| 2022/0270552 | A1* | 8/2022 | Roh | G09G 3/3266 |

FOREIGN PATENT DOCUMENTS

| | | | |
|---|---|---|---|
| CN | 110085170 | A | 8/2019 |
| CN | 110223640 | A | 9/2019 |
| CN | 110728952 | A | 1/2020 |
| CN | 111192903 | A | 5/2020 |
| CN | 111312129 | A | 6/2020 |
| CN | 111383579 | A | 7/2020 |
| CN | 111445848 | A | 7/2020 |
| CN | 111627387 | A | 9/2020 |
| CN | 111710299 | A | 9/2020 |
| CN | 111739471 | A | 10/2020 |
| CN | 111883043 | A | 11/2020 |
| CN | 109817165 | B | 4/2021 |
| WO | 2020181968 | A1 | 9/2020 |

OTHER PUBLICATIONS

Ryo Yonebayashi et al., "High refresh rate and low power consumption AMOLED panel using top-gate n-oxide and p-LTPS TFTS." J. of the Society for Information Display, 10.1002/jsid.888, 28, 4, (350-359) (Apr. 2020).

* cited by examiner

PIXEL DRIVE CIRCUIT, DRIVING METHOD THEREOF AND DISPLAY PANEL

CROSS-REFERENCE TO RELATED APPLICATION

This application is a national phase application under 35 U.S.C. § 371 of International Application No. PCT/CN2020/132866 filed Nov. 30, 2020, the contents of which being incorporated by reference in their entireties herein.

TECHNICAL FIELD

The present disclosure relates to the field of display technology and, in particular, to a pixel drive circuit, a driving method thereof, and a display panel.

BACKGROUND

A pixel drive circuit is used to drive a light-emitting unit in a pixel unit to emit light. In the related art, the pixel drive circuit includes a drive transistor and a capacitor. The drive transistor is used to output a driving current to the light-emitting unit according to its gate voltage output; the capacitor is connected to the gate of the drive transistor and is used to store charges to continuously provide voltage to the drive transistor during a light-emitting phase of the pixel drive circuit.

However, the gate of the drive transistor is likely to leak current through the transistor connected to it, thereby affecting the light-emitting stability of the pixel drive circuit in the light-emitting phase.

It should be noted that the information disclosed in the background art section above is only used to enhance the understanding of the background of the present disclosure, and therefore may include information that does not constitute the prior art known to those of ordinary skill in the art.

SUMMARY

According to an aspect of the present disclosure, there is provided a pixel drive circuit, which includes a drive transistor, a data writing circuit, a compensation circuit, a light-emitting control circuit, a storage circuit, and a reset circuit. A first electrode of the drive transistor is connected to a first node, a second electrode of the drive transistor is connected to a second node, and a gate of the drive transistor is connected to a third node; the data writing circuit is connected to the first node and a data signal terminal, and is used to transmit a signal of the data signal terminal to the first node in response to a control signal; the compensation circuit is connected to the second node and the third node, and is used to connect the second node and the third node in response to a control signal; the light-emitting control circuit is connected to the first electrode and the second electrode of the drive transistor, a first power supply terminal, a first electrode of a light-emitting unit, and an enable signal terminal, and is used to connect the first power supply terminal and an electrode of the drive transistor and connect the first electrode of the light-emitting unit and the other electrode of the drive transistor in response to a signal of the enable signal terminal; the storage circuit is connected between the third nodes; the reset circuit comprises a first transistor and a second transistor. A first electrode of the first transistor is connected to the third node, a second electrode of the first transistor is connected to the first electrode of the light-emitting unit, and a gate of the first transistor is connected to a reset signal terminal; a first electrode of the second transistor is connected to the second electrode of the first transistor, a second electrode of the second transistor is connected to an initial signal terminal, and a gate of the second transistor is connected to the reset signal terminal; wherein the first transistor and the second transistor are N-type oxide transistors, and the drive transistor is a P-type low-temperature polysilicon transistor.

In an exemplary embodiment of the present disclosure, the light-emitting control circuit is used to connect the first power supply terminal and the second electrode of the drive transistor and to connect the first electrode of the light-emitting unit and the first electrode of the drive transistor in response to the signal of the enable signal terminal.

In an exemplary embodiment of the present disclosure, the data writing circuit comprises a third transistor, a first electrode of which is connected to the data signal terminal, a second terminal of which is connected to the first node, and a gate of which is connected to a first gate drive signal terminal.

In an exemplary embodiment of the present disclosure, the compensation circuit comprises a fourth transistor, a first electrode of which is connected to the second node, a second electrode of which is connected to the third node, and a gate of which is connected to a second gate drive signal terminal; wherein the third transistor is a P-type low-temperature polysilicon transistor, and the fourth transistor is an N-type oxide transistor.

In an exemplary embodiment of the present disclosure, the compensation circuit comprises a fourth transistor, a first electrode of which is connected to the second node, a second electrode of which is connected to the third node, and a gate of which is connected to the first gate drive signal terminal; wherein the third transistor and the fourth transistor both are P-type low-temperature polysilicon transistors.

In an exemplary embodiment of the present disclosure, the compensation circuit comprises a fourth transistor, a first electrode of which is connected to the second node, a second electrode of which is connected to the third node, and a gate of which is connected to the first gate drive signal terminal; wherein the third transistor and the fourth transistor both are N-type oxide transistors.

In an exemplary embodiment of the present disclosure, the light-emitting control circuit comprises a fifth transistor and a sixth transistor. A first electrode of the fifth transistor is connected to the first power supply terminal, a second electrode of the fifth transistor is connected to the second node, and a gate of the fifth transistor is connected to the enable signal terminal; a first electrode of the sixth transistor is connected to the first node, a second electrode of the sixth transistor is connected to the first electrode of the light-emitting unit, and a gate of the sixth transistor is connected to the enable signal terminal.

In an exemplary embodiment of the present disclosure, the fifth transistor and the sixth transistor are P-type low temperature polysilicon transistors.

In an exemplary embodiment of the present disclosure, the storage circuit comprises a capacitor connected between the first power supply terminal and the third node.

According to an aspect of the present disclosure, there is provided a display panel comprising the pixel drive circuit mentioned above, and the display panel comprises a base substrate, a first active layer, a first conductive layer, a second active layer, a second conductive layer and a third conductive layer. The first active layer is located on a side of the base substrate, wherein the first active layer comprises a first active portion, and the first active portion is used to form a channel region of the drive transistor; the first conductive layer is located on a side of the first active layer away from the base substrate, and comprises a first conductive portion, an orthographic projection of which on the base substrate covers an orthographic projection of the first active portion on the base substrate, wherein the first conductive portion is used to form the gate of the drive transistor. The second active layer is located on a side of the first conductive layer away from the base substrate, and comprises a second active portion, a third active portion, a fourth active portion, a fifth active portion and a sixth active portion. An orthographic projection of the second active portion on the base substrate is located on a side of the orthographic projection of the first conductive portion on the base substrate in a first direction; in the first direction, an orthographic projection of the third active portion on the base substrate is located between the orthographic projection of the first conductive portion on the base substrate and the orthographic projection of the second active portion on the base substrate, and the orthographic projection of the third active portion on the base substrate is located on a side of the orthographic projection of the second active portion on the base substrate in a second direction, the first direction intersects the second direction; the fourth active portion is connected between the second active portion and the third active portion, and an orthographic projection of the fourth active portion on the base substrate is located on a side of the orthographic projection of the third active portion on the base substrate in a third direction, the second direction is opposite to the third direction, and in the first direction, the orthographic projection of the fourth active portion on the base substrate is located between the orthographic projection of the first conductive portion on the base substrate and the orthographic projection of the second active portion on the base substrate; the fifth active portion is connected to the second active portion, and an orthographic projection of the fifth active portion on the base substrate is located on a side of the orthographic projection of the second active portion on the base substrate in the first direction; the sixth active portion is connected to the third active portion, and an orthographic projection of the sixth active portion on the base substrate is located on a side of the orthographic projection of the third active portion on the base substrate in the second direction. The second conductive layer is disposed on a side of the second active layer away from the base substrate, and comprises a first grid line and a first protrusion. An orthographic projection of the first grid line on the base substrate extends in the second direction, wherein the first grid line comprises a second conductive portion, and an orthographic projection of the second conductive portion on the base substrate and the orthographic projection of the second active portion on the base substrate overlap, and the second conductive portion is used to form a first gate of a second transistor; the first protrusion is connected to the first grid line, wherein in the first direction, an orthographic projection of the first protrusion on the base substrate is located between the orthographic projection of the first grid line on the base substrate and the orthographic projection of the first conductive portion on the base substrate, the first protrusion comprises a third conductive portion, and an orthographic projection of the third conductive portion on the base substrate and the orthographic projection of the third active portion on the base substrate overlap to form a first gate of a first transistor. The third conductive layer is disposed on a side of the second conductive layer away from the base substrate, and comprises a first connecting portion and an initial signal line. The first connecting portion connects the sixth active portion and the first conductive portion through a via hole; an orthographic projection of the initial signal line on the base substrate extends in the second direction, and is located on a side of the orthographic projection of the first grid line on the base substrate in the first direction, and the initial signal line is connected to the fifth active portion through a via hole.

In an exemplary embodiment of the present disclosure, the display panel further comprises a fourth conductive layer disposed between the first conductive layer and the second active layer. The fourth conductive layer comprises a second grid line and a second protrusion, wherein an orthographic projection of the second grid line on the base substrate extends in the second direction, the second grid line comprises a fourth conductive portion, the orthographic projection of the second active portion on the base substrate is located on an orthographic projection of the fourth conductive portion on the base substrate, and the fourth conductive portion is used to form a second gate of the second transistor; the second protrusion is connected to the second grid line, wherein in the first direction, an orthographic projection of the second protrusion on the base substrate is located between the orthographic projection of the second grid line on the base substrate and the orthographic projection of the first conductive portion on the base substrate, the second protrusion comprises a fifth conductive portion, and the orthographic projection of the third active portion on the base substrate is located on an orthographic projection of the five conductive portion on the base substrate, and the fifth conductive portion is used to form a second gate of the first transistor.

In an exemplary embodiment of the present disclosure, the light-emitting control circuit comprises a fifth transistor and a sixth transistor. A first electrode of the fifth transistor is connected to the first power supply terminal, a second electrode of the fifth transistor is connected to the second node, and a gate of the fifth transistor is connected to the enable signal terminal; a first electrode of the sixth transistor is connected to the first node, a second electrode of the sixth transistor is connected to the first electrode of the light-emitting unit, and a gate of the sixth transistor is connected to the enable signal terminal. The first active layer further comprises a seventh active portion and an eighth active portion. The seventh active portion is used to form a channel region of the fifth transistor, wherein in the first direction, an orthographic projection of the seventh active portion on the base substrate is located between the orthographic projection of the first conductive portion on the base substrate and the orthographic projection of the fourth active portion on the base substrate; the eighth active portion is used to form a channel region of the sixth transistor, wherein in the first direction, an orthographic projection of the eighth active portion on the base substrate is located between the orthographic projection of the first conductive portion on the base substrate and the orthographic projection of the fourth active portion on the base substrate. The first conductive layer further comprises a third grid line, and an orthographic projection of the third grid line on the base substrate extends in the second direction, wherein the orthographic projection of the third grid line on the base substrate covers the orthographic projections of the seventh active portion and the eighth active portion on the base substrate, and a part of the third grid line is used to form a gate of the fifth transistor, and a part of the third grid line is used to form a gate of the sixth transistor.

In an exemplary embodiment of the present disclosure, the data writing circuit comprises a third transistor, a first electrode of which is connected to the data signal terminal, a second terminal of which is connected to the first node, and a gate of which is connected to a first gate drive signal terminal. The compensation circuit comprising a fourth transistor, a first electrode of which is connected to the second node, a second electrode of which is connected to the third node, and a gate of which is connected to the second gate drive signal terminal. The third transistor and the fourth transistor both are P-type low-temperature polysilicon transistors. The first active layer further comprises a ninth active portion and a tenth active portion. The ninth active portion is used to form a channel region of the third transistor, wherein an orthographic projection of the ninth active portion on the base substrate is located on a side of the orthographic projection of the first conductive portion on the base substrate in a fourth direction, and the fourth direction is opposite to the first direction; the tenth active portion is used to form a channel region of the fourth transistor, wherein an orthographic projection of the tenth active portion on the base substrate is located on a side of the orthographic projection of the first conductive portion on the base substrate in the fourth direction. The first conductive layer further comprises a fourth grid line, and an orthographic projection of the fourth grid line on the base substrate extends in the second direction, wherein the orthographic projection of the fourth grid line on the base substrate covers the orthographic projections of the ninth active portion and the tenth active portion on the base substrate, a part of the fourth grid line is used to form a gate of the third transistor, and a part of the fourth grid line is used to form a gate of the fourth transistor.

In an exemplary embodiment of the present disclosure, the display panel further comprises a fifth conductive layer disposed on a side of the third conductive layer away from the base substrate. The fifth conductive layer comprises a first power cord, a first shielding portion, a first data line and a second shielding portion. An orthographic projection of the first power cord on the base substrate extends in the first direction, and the first power cord comprises a first edge; the first shielding portion is connected to the power cord, wherein the first shielding portion comprises a second edge connected to the first edge of the first power cord, and an angle between an orthographic projection of the first edge on the base substrate and an orthographic projection of the second edge on the base substrate is less than 180°, and an orthographic projection of the first shielding portion on the base substrate covers the orthographic projection of the third active portion on the base substrate; an orthographic projection of the first data line on the base substrate extends in the first direction, and the first data line comprises a third edge; the second shielding portion is connected to the data line, wherein the second shielding portion comprises a fourth edge connected to the third edge of the first data line, and an angle between an orthographic projection of the third edge on the base substrate and an orthographic projection of the fourth edge on the base substrate is less than 180°, and an orthographic projection of the second shielding portion on the base substrate covers the orthographic projection of the second active portion on the base substrate.

In an exemplary embodiment of the present disclosure, the data writing circuit comprises a third transistor, a first electrode of which is connected to the data signal terminal, a second electrode of which is connected to the first node, and a gate of which is connected to a first gate drive signal terminal. The compensation circuit comprises a fourth transistor, a first electrode of which is connected to the second node, a second electrode of which is connected to the third node, and a gate of which is connected to a second gate drive signal terminal. The third transistor is a P-type low-temperature polysilicon transistor, and the fourth transistor is an N-type oxide transistor. The first active layer further comprises an eleventh active portion used to form a channel region of the third transistor, wherein an orthographic projection of the eleventh active portion on the base substrate is located on a side of the orthographic projection of the first conductive portion on the base substrate in the fourth direction, and the fourth direction is opposite to the first direction; the first conductive layer also comprises a fifth grid line, an orthographic projection of the fifth grid line on the base substrate extends in the second direction, wherein the orthographic projection of the fifth grid line on the base substrate covers the orthographic projection of the eleventh active portion on the base substrate, and a part of the fifth grid line is used to form a gate of the third transistor. The fourth conductive layer further comprises a sixth grid line, and an orthographic projection of the sixth grid line on the base substrate extends in the second direction, wherein the orthographic projection of the sixth grid line on the base substrate is located on a side of the orthographic projection of the fifth grid line on the base substrate in the fourth direction. The second active layer also comprises a twelfth active portion, a thirteenth active portion and a fourteenth active portion. The twelfth active portion is used to form a first channel region of the fourth transistor, and an orthographic projection of the twelfth active portion on the base substrate is located on the orthographic projection of the sixth grid line on the base substrate; the thirteenth active portion is used to form a second channel region of the fourth transistor, and an orthographic projection of the thirteenth active portion on the base substrate is located on the orthographic projection of the sixth grid line on the base substrate; the fourteenth active portion is connected between the twelfth active portion and the thirteenth active portion, and an orthographic projection of the fourteenth active portion on the base substrate is located on a side of the orthographic projection of the sixth grid line on the base substrate in the fourth direction. The second conductive layer further comprises a seventh grid line, and an orthographic projection of the seventh grid line on the base substrate extends in the second direction, wherein the orthographic projection of the seventh grid line on the base substrate covers the orthographic projections of the twelfth active portion and the thirteenth active portion on the base substrate.

In an exemplary embodiment of the present disclosure, the fifth conductive layer further comprises a second power cord, and an orthographic projection of the second power cord on the base substrate extends in the first direction and covers the orthographic projection of the fourteenth active portion on the base substrate.

In an exemplary embodiment of the present disclosure, the second power cord comprises a fifth edge, and the fifth conductive layer further comprises a third shielding portion connected to the second power cord, wherein the third shielding portion comprises a sixth edge connected to the fifth edge of the second power cord, an angle between an orthographic projection of the fifth edge on the base substrate and an orthographic projection of the sixth edge on the base substrate is less than 180°, and an orthographic projection of the third shielding portion on the base substrate covers the orthographic projections of the second active portion and the third active portion on the base substrate.

According to an aspect of the present disclosure, there is provided a display panel including the above-mentioned pixel drive circuit.

According to an aspect of the present disclosure, there is provided a driving method for a pixel drive circuit used to drive the above-mentioned pixel drive circuit, and the method includes:

in a reset phase, turning on the first transistor and the second transistor to input an initial signal to the third node and the first electrode of the light-emitting unit through the initial signal terminal;

in a compensation phase, turning on the first node and the third node by the compensation circuit, and at the same time writing a data signal to the first node by the data writing circuit;

in a light-emitting phase, connecting the first power supply terminal and an electrode of the drive transistor and connecting the first electrode of the light-emitting unit and the other electrode of the drive transistor by the light-emitting control circuit.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the present disclosure, and are used to explain the principle of the present disclosure together with the specification. Understandably, the drawings mentioned in the following description are only some embodiments of the present disclosure. For those of ordinary skill in the art, other drawings may be obtained based on these drawings without creative work.

DETAILED DESCRIPTION

Figure 1:
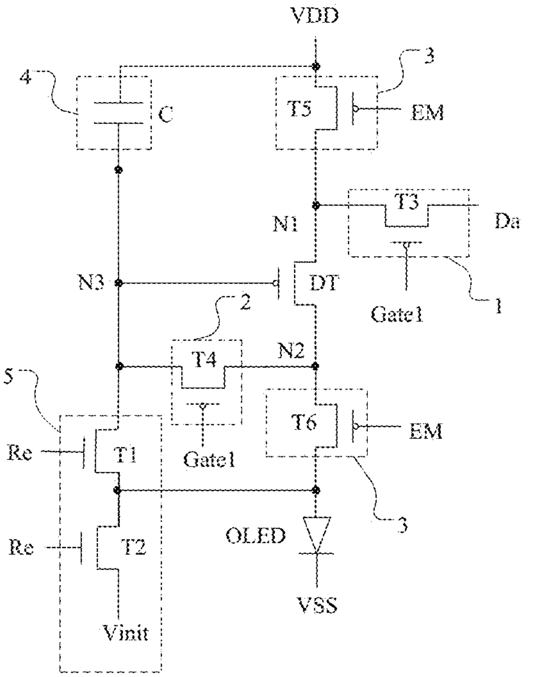
FIG. 1 is a schematic structural diagram of an exemplary embodiment of a pixel drive circuit of the present disclosure.

Example embodiments will now be described more fully with reference to the accompanying drawings. However, the example embodiments may be implemented in various forms, and should not be construed as being limited to the examples set forth herein; on the contrary, these embodiments are provided to make the present disclosure more comprehensive and complete, and fully convey the concept of the example embodiments to those of ordinary skill in the art. The same reference numerals in the figures indicate the same or similar structures, and thus their detailed descriptions will be omitted.

Although relative terms such as "upper" and "lower" are used in this specification to describe the relative relationship between labeled one component and another component, these terms are used in this specification only for convenience, for example, exemplary directions as shown according to the drawings. It may be understood that if the labeled device is turned over and turned upside down, the component described as "upper" will become the "lower" component. Other relative terms, such as "high", "low", "top", "bottom", "left", and "right" have similar meanings. When a structure is "on" another structure, it may mean that a certain structure is integrally formed on other structures, or that a certain structure is "directly" arranged on other structures, or that a certain structure is "indirectly" arranged on other structures through another structure.

The terms "a", "an", and "the" are used to indicate the presence of one or more elements/components/etc.; the terms "comprise" and "have" are used to mean open-ended inclusion and mean that there may be additional elements/components/etc. in addition to the listed elements/components/etc.

The exemplary embodiment provides a pixel drive circuit, as shown in FIG. 1, which is a schematic structural diagram of an exemplary embodiment of the pixel drive circuit of the present disclosure. The pixel drive circuit may include a drive transistor DT, a data writing circuit 1, a compensation circuit 2, a light-emitting control circuit 3, a storage circuit 4 and a reset circuit 5. A first electrode of the drive transistor DT is connected to a first node N1, a second electrode thereof is connected to a second node N2, and a gate thereof is connected to a third node N3; the data writing circuit 1 is connected to the first node N1 and the data signal terminal Da so as to transmit a signal of the data signal terminal Da to the first node N1 in response to a control signal; the compensation circuit 2 is connected to the second node N2 and the third node N3, and is used to connect the second node N2 and the third node N3 in response to a control signal; the light-emitting control circuit is connected to a first electrode and a second electrode of the drive transistor DT, a first power supply terminal VDD, a first electrode of the light-emitting unit OLED, and the enable signal terminal EM. The light-emitting control circuit 3 connects the first power supply terminal VDD and the first electrode of the drive transistor DT (i.e., the first node N1) in response to the signal of the enable signal terminal EM, and connects the first electrode the light-emitting unit OLED and the second electrode of the drive transistor DT (i.e., the second node N2); the reset circuit includes a first transistor T1 and a second transistor T2. A first electrode of the first transistor T1 is connected to the third node N3, a second electrode thereof is connected to the first electrode of the light-emitting unit OLED, and a gate thereof is connected to a reset signal terminal Re; a first electrode of the second transistor T2 is connected to the second electrode of the transistor T1, the second electrode thereof is connected to an initial signal terminal Vinit, and the gate thereof is connected to the reset signal terminal Re; wherein the first transistor T1 and the second transistor T2 are N-type oxide transistors, and the drive transistor DT is a P-type low-temperature polysilicon transistor. The first electrode of the light-emitting unit OLED may be an anode of the light-emitting unit, and a cathode of the light-emitting unit OLED may be connected to a second power supply terminal VSS.

In a reset phase of the pixel drive circuit, the first transistor T1 and the second transistor T2 can be turned on to input the initial signal to the third node N3 and the first electrode of the light-emitting unit OLED by the initial signal terminal Vinit; in a compensation phase, the first node N1 and the third node N3 may be turned on by the compensation circuit 2, and at the same time a data signal is written to the first node N1 by means of the data writing circuit 1, thereby a voltage Vdata+Vth is written to the third node and is stored in the storage circuit, wherein Vdata is a voltage of the data signal, and Vth is a threshold voltage of the drive transistor; in a light-emitting phase, by the light-emitting control circuit 3, the first power supply terminal VDD and the first electrode of the drive transistor DT (that is, the second node N1) are connected, and the first electrode of the light-emitting unit OLED and the second electrode of the drive transistor DT (that is, the second node N2) are connected, and the drive transistor DT outputs a driving current to the light-emitting unit OLED under the charge action of the third node N3.

In this exemplary embodiment, on the one hand, the drive transistor DT in the pixel drive circuit may be a P-type low-temperature polysilicon transistor. The low-temperature polysilicon transistor has a relatively high carrier mobility, so that the pixel drive circuit is beneficial to achieve a display panel with high resolution, high response speed, high pixel density and high aperture ratio; on the other hand, the first transistor T1 and the second transistor T2 are N-type oxide transistors, so that the oxide transistors have a smaller leakage current, which can reduce the leakage current of the third node N3 of the pixel drive circuit passing through the first transistor T1 and the second transistor T2 in the light-emitting phase. In another aspect, the first transistor T1 and the second transistor T2 are connected in series between the third node N3 and the initial signal terminal Vinit, so as to reduce the leakage current from the third node N3 to the initial signal terminal Vinit; in another aspect, in the reset phase, the voltage written by the initial signal terminal Vinit to the third node N3 needs to be able to turn on the drive transistor DT so as to write the voltage Vdata+Vth to the third node N3 in the compensation phase. Therefore, the voltage of the initial signal terminal Vinit is relatively small, generally is a negative value, and in the light-emitting phase, the voltage of the second node N2 is lower than the voltage of the third node N3 and is higher than the voltage of the initial signal terminal Vinit, that is, the voltage of the first electrode of the light-emitting unit OLED is lower than the voltage of the third node N3 and is higher than the voltage of the initial signal terminal Vinit. At the same time, since the second electrode of the first transistor T1 is connected to the first electrode of the light-emitting unit OLED, the voltage of the first electrode of the light-emitting unit OLED may effectively isolate a larger cross voltage between the third node N3 and the initial signal terminal Vinit, so as to reduce the leakage current from the third node to the initial signal terminal Vinit.

In the pixel drive circuit shown in FIG. 1, the voltage of the second node N2 changes with the voltage change of the third node N3. For example, in a high gray scale state, the voltage of the third node N3 is relatively low, and the voltage of the second node is relatively high. In the low gray scale state, the voltage of the third node N3 is relatively high, and the voltage of the second node is relatively low. Therefore, in different display gray scales, there are different voltage differences between the third node N3 and the second node N2, so that in different display gray scales, there are different leakage currents from the third node N3 to the second node N. In particular, in the low gray scale state, the leakage current from the third node N3 to the second node N2 is relatively large. At the same time, since the human eyes are more sensitive to the brightness changes at low brightness, the leakage current from the third node N3 to the second node N2 will seriously affect the display effect of the display panel.

Figure 2:
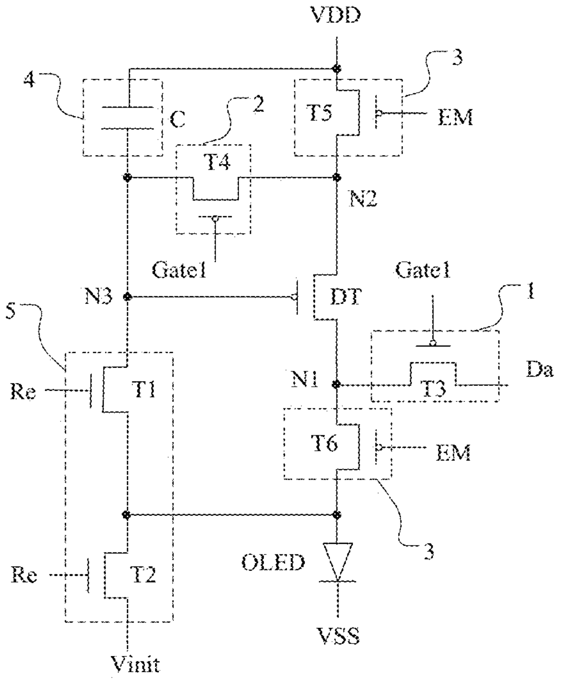
FIG. 2 is a schematic structural diagram of another exemplary embodiment of the pixel drive circuit of the present disclosure.

As shown in FIG. 2, it is a schematic structural diagram of another exemplary embodiment of the pixel drive circuit of the present disclosure. Wherein, the light-emitting control circuit 3 may be used to connect the first power supply terminal VDD and the second electrode of the drive transistor DT (i.e., the second node N2) and to connect the first electrode of the light-emitting unit OLED and the first electrode of the drive transistor DT (i.e., the first node N1) in response to the signal of the enable signal terminal EM. Other structures of the pixel drive circuit may be the same as those of the pixel drive circuit shown in FIG. 1.

In this exemplary embodiment, the first power supply terminal VDD is connected to the second node N2, and the first electrode of the light-emitting unit OLED is connected to the first node. During the light-emitting phase of the pixel drive circuit, the voltage of the second node N2 is stabilized to the voltage of the first power supply terminal VDD, and the voltage of the second node N2 will not change with the change of the drive gray scale. Therefore, the pixel drive circuit has a relatively stable drive effect. Especially in the low gray scale drive state, the voltage of the third node N3 is relatively high, the voltage of the second node N2 is also relatively high, and there is a relatively low leakage current from the third node N3 to the second node N2.

In this exemplary embodiment, as shown in FIGS. 1 and 2, the data writing circuit 1 may include a third transistor T3. A first electrode of the third transistor T3 is connected to the data signal terminal Da, and a second electrode thereof is connected to the first node N1, a gate thereof is connected to a first gate drive signal terminal Gate1.

In this exemplary embodiment, as shown in FIGS. 1 and 2, the compensation circuit 2 may include a fourth transistor T4. A first electrode of the fourth transistor T4 is connected to the second node N2, and a second electrode thereof is connected to the third node. N3, a gate thereof is connected to the first gate drive signal terminal Gate1; wherein both of the third transistor T3 and the fourth transistor T4 may be P-type low-temperature polysilicon transistors.

In this exemplary embodiment, as shown in FIG. 1, the light-emitting control circuit 3 may include a fifth transistor T5 and a sixth transistor T6. A first electrode of the fifth transistor T5 is connected to the first power supply terminal VDD, and a second electrode thereof is connected to the first node N1, and a gate thereof is connected to the enable signal terminal EM; a first electrode of the sixth transistor T6 is connected to the second node N2, and a second electrode thereof is connected to the first electrode of the light-emitting unit OLED, a gate thereof is connected to the enable signal terminal EM. Wherein, the fifth transistor T5 and the sixth transistor T6 may be P-type low-temperature polysilicon transistors.

In this exemplary embodiment, as shown in FIG. 2, the light-emitting control circuit 3 may include the fifth transistor T5 and the sixth transistor T6. The first electrode of the fifth transistor T5 is connected to the first power supply terminal VDD, and a second electrode thereof is connected to the second node N2, and a gate thereof is connected to the enable signal terminal EM; a first electrode of the sixth transistor T6 is connected to the first node N1, and a second electrode thereof is connected to the first electrode of the light-emitting unit OLED, a gate thereof is connected to the enable signal terminal EM. Wherein, the fifth transistor T5 and the sixth transistor T6 may be P-type low-temperature polysilicon transistors.

In this exemplary embodiment, as shown in FIGS. 1 and 2, the storage circuit 4 may include a capacitor C, and the capacitor C may be connected between the first power supply terminal VDD and the third node N3. It should be understood that the capacitor C may also be connected between the third node N3 and another stable signal terminal.

Figure 3:
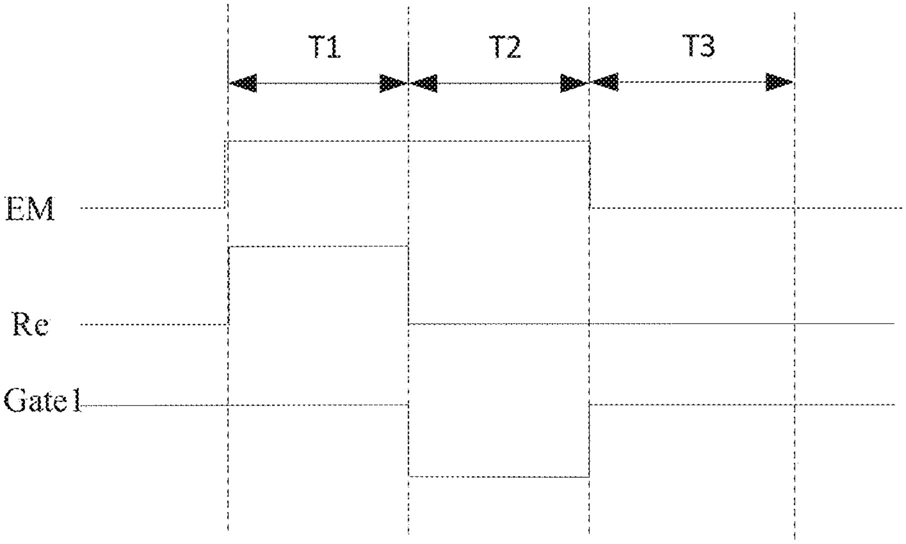
FIG. 3 is a timing diagram of each node in a driving method of the pixel drive circuit in FIG. 2.

As shown in FIG. 3, it is a timing diagram of each node in a driving method of the pixel drive circuit in FIG. 2, among which, EM represents a signal timing of the enable signal terminal, Re represents the signal timing of the reset signal terminal, and Gate1 represents the signal timing of the first gate drive signal terminal. The driving method of the pixel drive circuit includes three phases: a reset phase T1, a compensation phase T2 and a light-emitting phase T3. In the reset phase T1, the reset signal terminal outputs a high-level signal to turn on the first transistor T1 and the second transistor T2, and the signal of the initial signal terminal Vinit is transmitted to the third node and the first electrode of the light-emitting unit OLED, wherein the drive transistor DT is turned on under the effect of the signal of the initial signal terminal; in the compensation phase T2, the first gate drive signal terminal Gate1 outputs a low-level signal, the third transistor T3 and the fourth transistor T4 are turned on, and a voltage Vdata+Vth is written from the data signal terminal to the third node, wherein Vdata is a voltage of the data signal terminal, and Vth is a threshold voltage of the drive transistor; in the light-emitting phase T3, the enable signal terminal outputs a low-level signal to turn on the sixth transistor T6 and the fifth transistor T5, and the drive transistor DT emits light under the action of the voltage Vdata+Vth stored in the capacitor C. The output current formula of the drive transistor $I=(\mu WCox/2L)(Vgs-Vth)^2$, wherein p is the carrier mobility; Cox is the gate capacitance per unit area, W is the width of the drive transistor channel, and L is the length of the drive transistor channel, Vgs is the gate-source voltage difference of the drive transistor, and Vth is the threshold voltage of the drive transistor. The output current of the drive transistor in the pixel drive circuit of the present disclosure $I=(\mu WCox/2L)(Vdata+Vth-Vdd-Vth)^2$. The pixel drive circuit can avoid the influence of the threshold value of the drive transistor on its output current.

Figure 4:
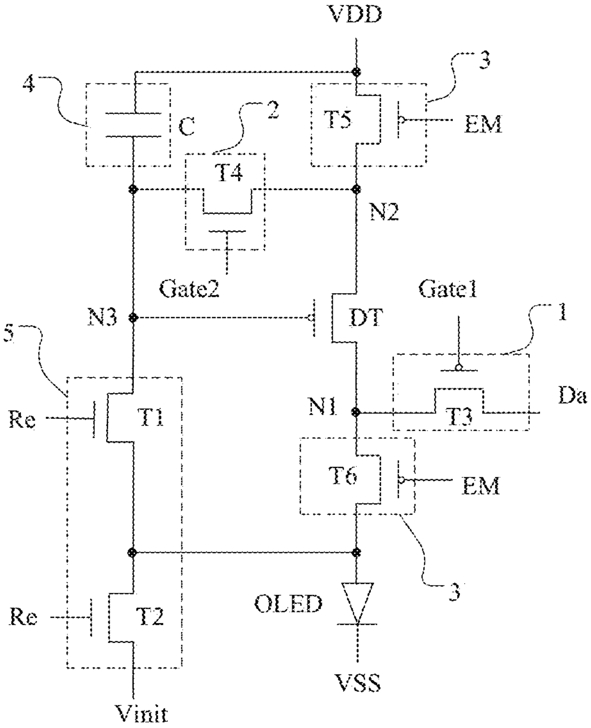
FIG. 4 is a schematic structural diagram of another exemplary embodiment of the pixel drive circuit of the present disclosure.

In this exemplary embodiment, as shown in FIG. 4, it is a schematic structural diagram of another exemplary embodiment of the pixel drive circuit of the present disclosure. Compared with the pixel drive circuit shown in FIG. 2, this pixel drive circuit is different in that the third transistor T3 may be a P-type low-temperature polysilicon transistor, and the fourth transistor T4 may be an N-type oxide transistor. Correspondingly, the fourth transistor T4 may be connected to a second gate drive signal terminal Gate2, so as to turn on the fourth transistor T4 by the second gate drive signal terminal Gate2 in the compensation phase. The oxide transistor has a relatively small leakage current, which, in the light-emitting phase, may reduce the electric leakage from the third node N3 of the pixel drive circuit to the second node through the fourth transistor.

Figure 5:
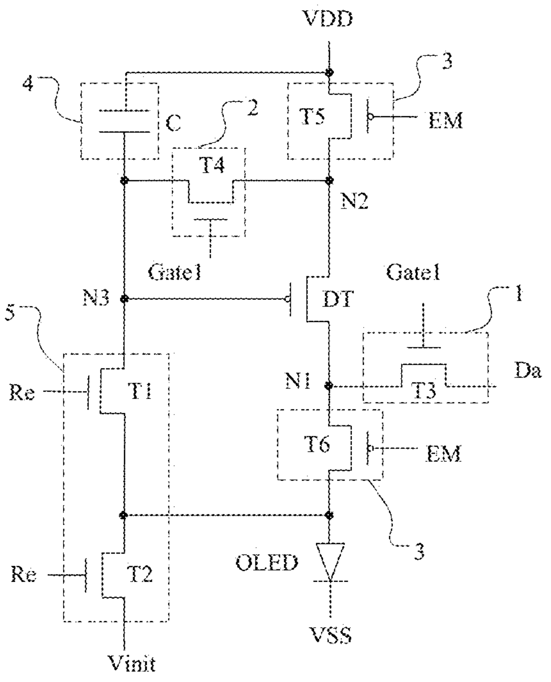
FIG. 5 is a schematic structural diagram of another exemplary embodiment of the pixel drive circuit of the present disclosure.

In this exemplary embodiment, as shown in FIG. 5, it is a schematic structural diagram of another exemplary embodiment of the pixel drive circuit of the present disclosure. Compared with the pixel drive circuit shown in FIG. 2, this pixel drive circuit is different in that both the third transistor T3 and the fourth transistor T4 may be N-type oxide transistors. Both the third transistor T3 and the fourth transistor T4 may be turned on under the action of the high level of the first gate drive signal terminal Gate1 in the compensation phase to write a compensation voltage to the third node. This arrangement reduces the electric leakage from the third node N3 to the second node through the fourth transistor, and at the same time may drive the third transistor T3 and the fourth transistor T4 only through the first gate drive signal terminal Gate1, that is, by applying the display panel of the pixel driven circuit, the third transistor T3 and the fourth transistor T4 may be simultaneously driven by one gate drive circuit.

In this exemplary embodiment, the third transistor T3 and the fourth transistor T4 in FIGS. 1, 2, 4, and 5 each may have a double-gate structure, that is, the third transistor T3 and the fourth transistor T4 each may include two active regions. This arrangement may reduce the electric leakage of the third transistor T3 and the fourth transistor T4.

Figure 8:
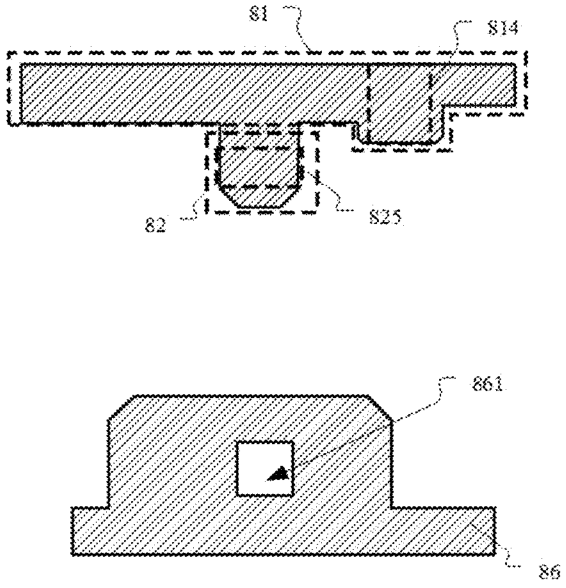
FIG. 8 is a structural layout of a fourth conductive layer in an exemplary embodiment of the display panel of the present disclosure.
Figure 9:
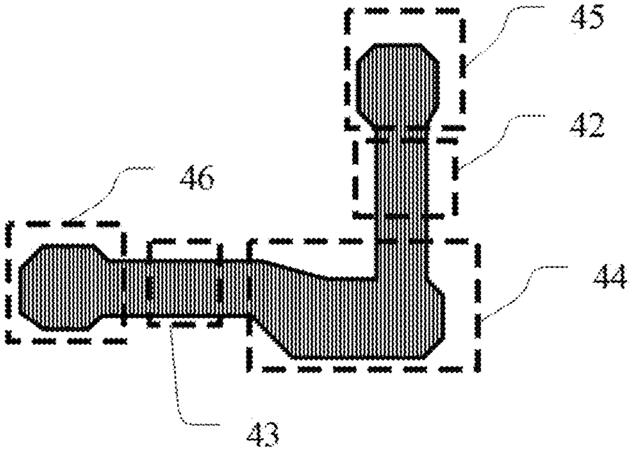
FIG. 9 is a structural layout of a second active layer in an exemplary embodiment of the display panel of the present disclosure.
Figure 10:
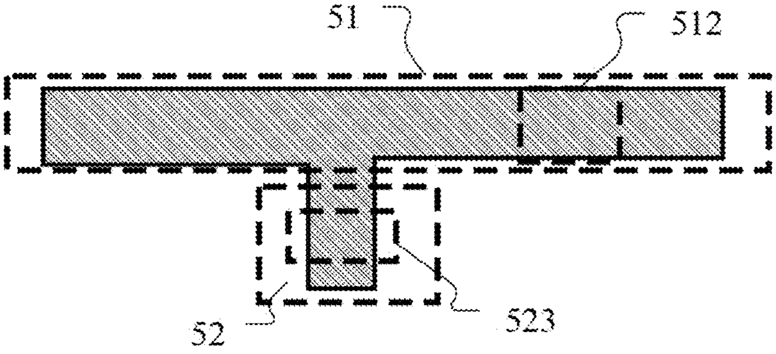
FIG. 10 is a structural layout of a second conductive layer in an exemplary embodiment of the display panel of the present disclosure.
Figure 11:
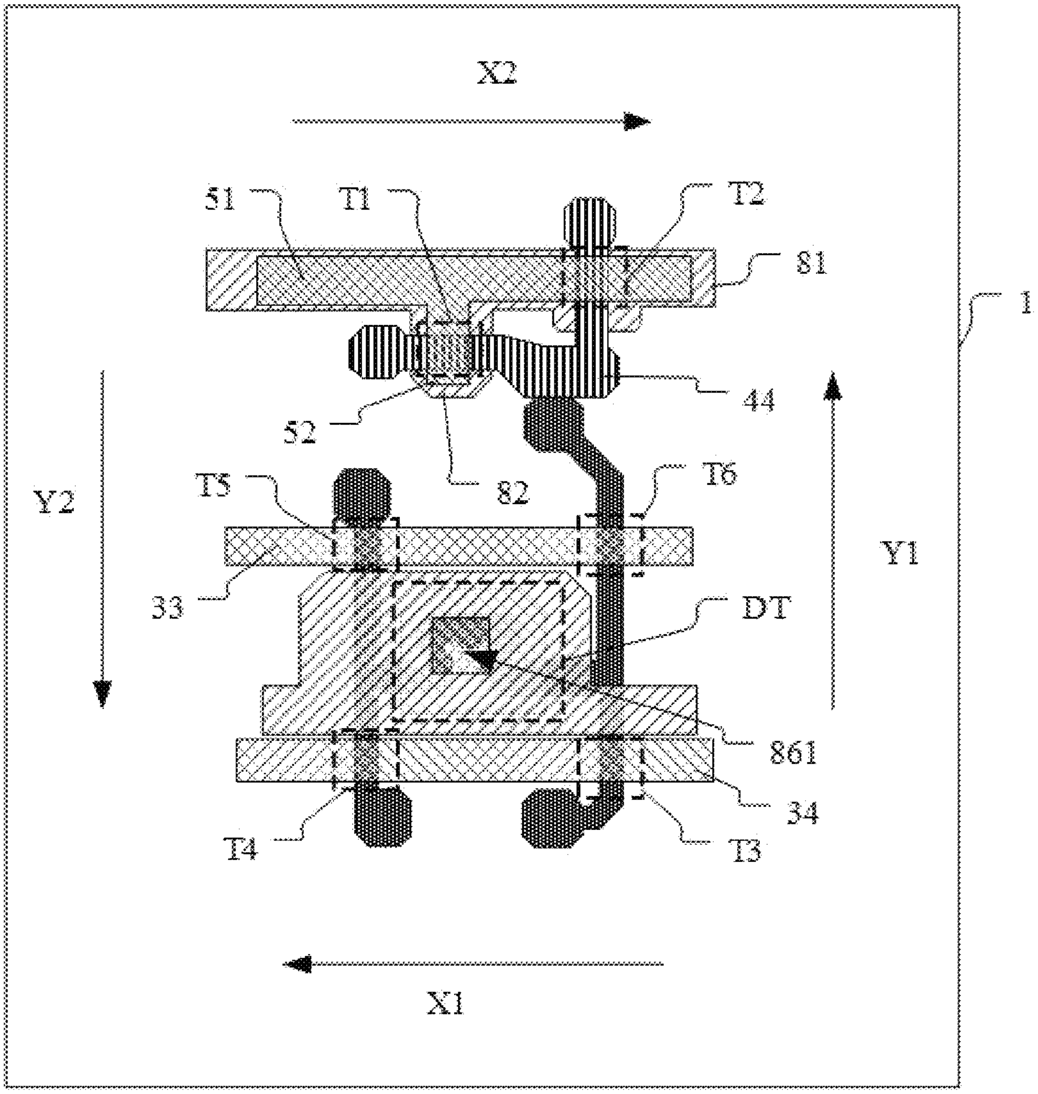
FIG. 11 is a layout diagram of a laminated structure of the first active layer, the first conductive layer, the fourth conductive layer, the second active layer and the second conductive layer in an exemplary embodiment of the display panel of the present disclosure.
Figure 12:
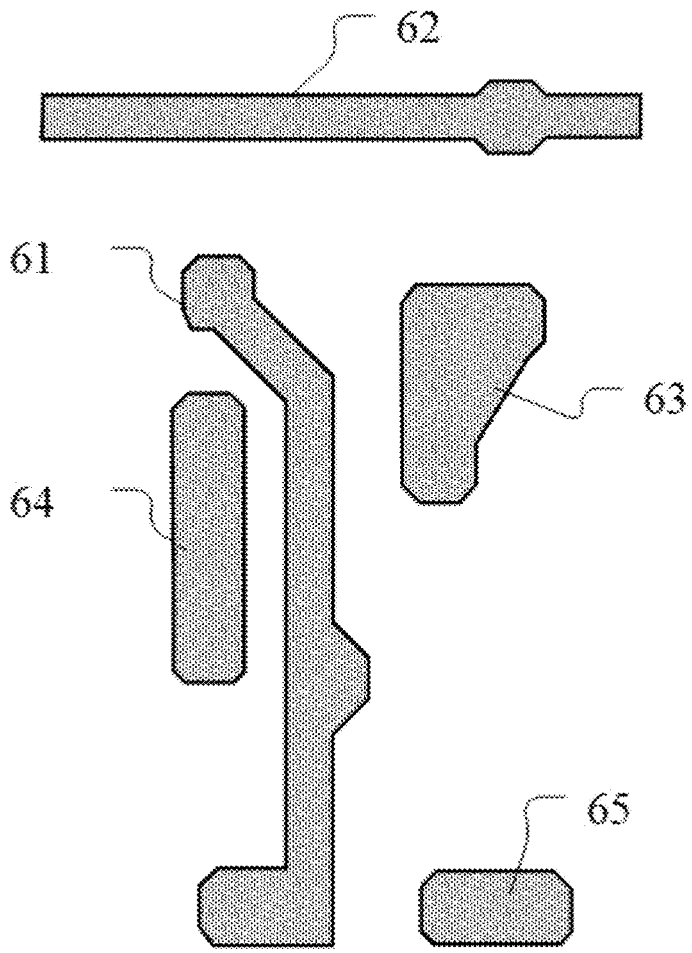
FIG. 12 is a structural layout of a third conductive layer in an exemplary embodiment of the display panel of the present disclosure.
Figure 13:
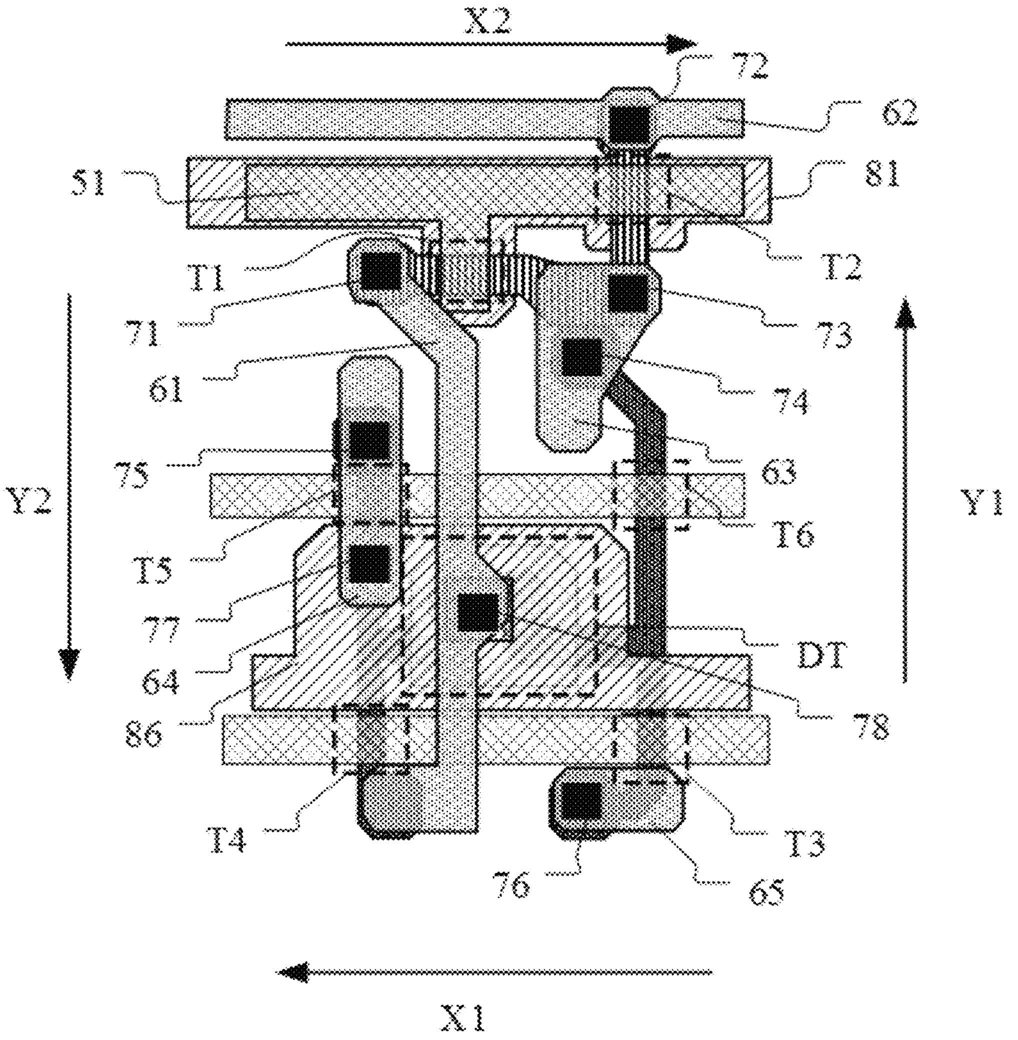
FIG. 13 is a layout diagram of a laminated structure of the first active layer, the first conductive layer, the fourth conductive layer, the second active layer, the second conductive layer and the third conductive layer in an exemplary embodiment of a display panel of the present disclosure.
Figure 14:
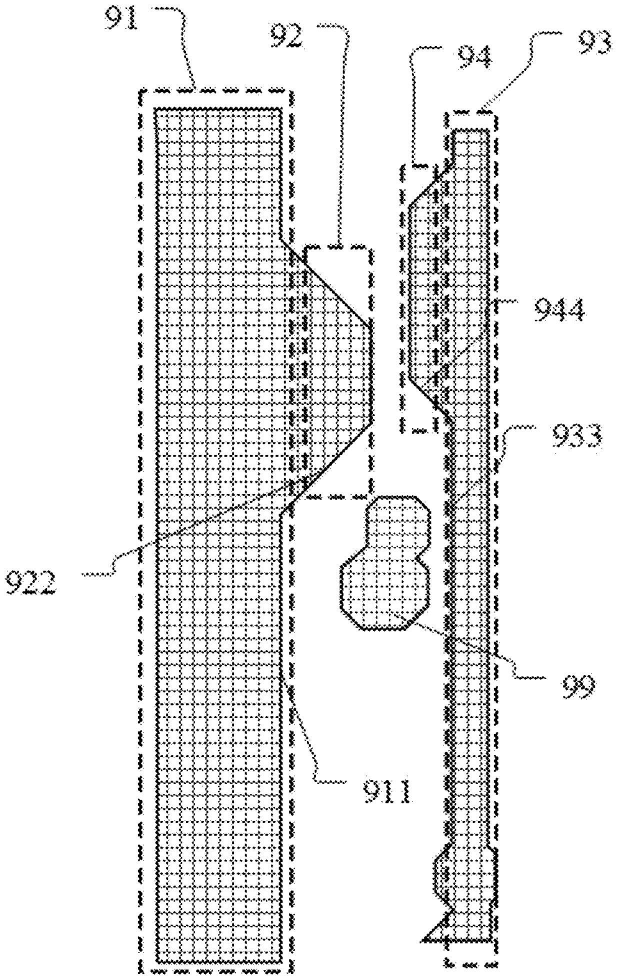
FIG. 14 is a structural layout of a fifth conductive layer in an exemplary embodiment of the display panel of the present disclosure.
Figure 15:
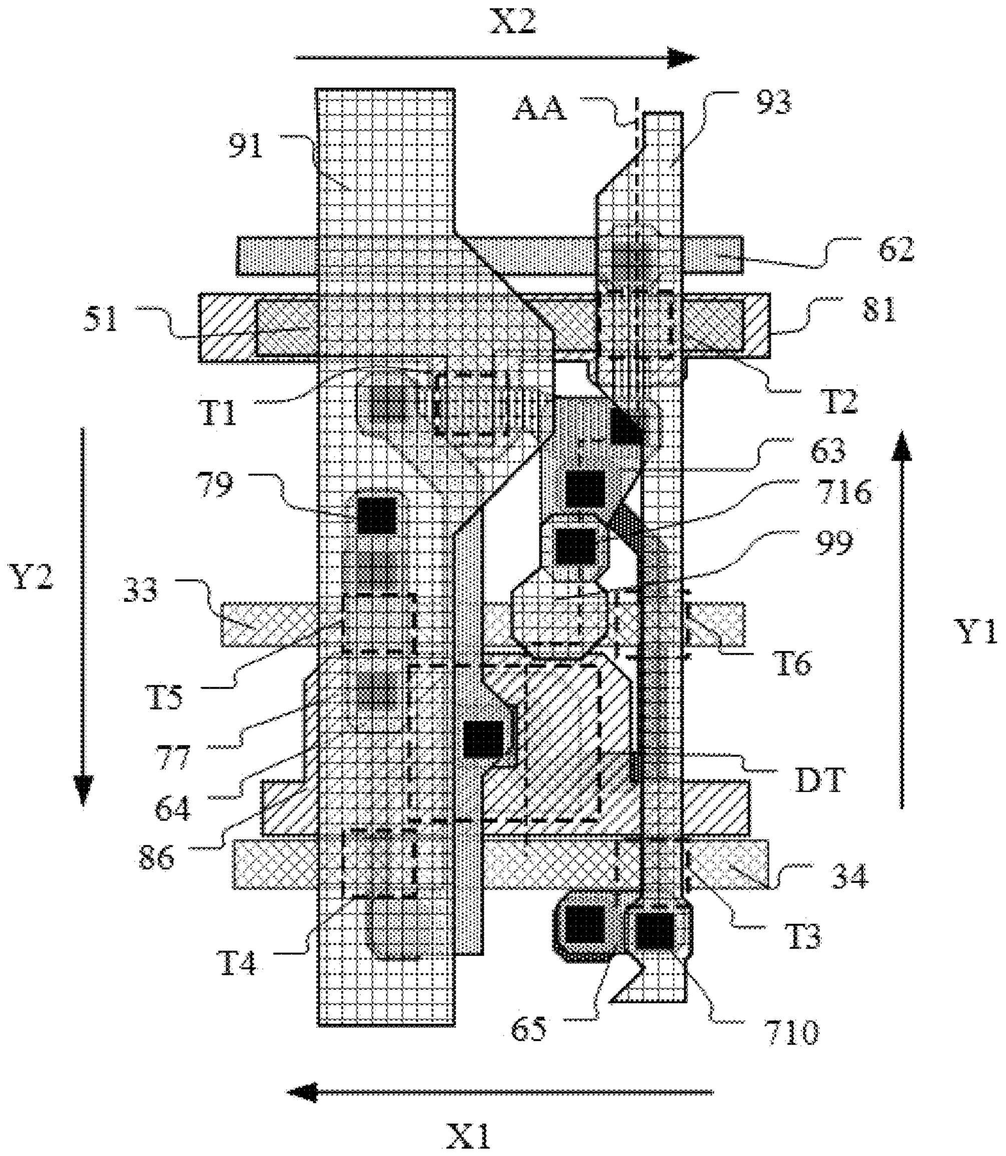
FIG. 15 is a layout diagram of a laminated structure of the first active layer, the first conductive layer, the fourth conductive layer, the second active layer, the second conductive layer, the third conductive layer and the fifth conductive layer in an exemplary embodiment of the display panel of the present disclosure.

This exemplary embodiment also provides a display panel, which may include the pixel drive circuit shown in FIG. 2. As shown in FIGS. 6-15, FIG. 6 is a structural layout of a first active layer in an exemplary embodiment of a display panel of the present disclosure; FIG. 7 is a structural layout of a first conductive layer in an exemplary embodiment of the display panel of the present disclosure; FIG. 8 is a structure layout of a fourth conductive layer in an exemplary embodiment of the display panel of the present disclosure; FIG. 9 is a structural layout of a second active layer in an exemplary embodiment of the display panel of the present disclosure; FIG. 10 is a structural layout of a second conductive layer in an exemplary embodiment of the display panel of the present disclosure; FIG. 11 is a layout diagram of a laminated structure of the first active layer, the first conductive layer, the fourth conductive layer, the second active layer and the second conductive layer in an exemplary embodiment of the display panel of the present disclosure; FIG. 12 is a structural layout of a third conductive layer in an exemplary embodiment of the display panel of the present disclosure; FIG. 13 is a layout diagram of a laminated structure of the first active layer, the first conductive layer, the fourth conductive layer, the second active layer, the second conductive layer and the third conductive layer in an exemplary embodiment of a display panel of the present disclosure; FIG. 14 is a structural layout of a fifth conductive layer in an exemplary embodiment of the display panel of the present disclosure; FIG. 15 is a layout diagram of a laminated structure of the first active layer, the first conductive layer, the fourth conductive layer, the second active layer, the second conductive layer, the third conductive layer and the fifth conductive layer in an exemplary embodiment of the display panel of the present disclosure.

As shown in FIGS. 6-13, the display panel may include: a base substrate 1, a first active layer, a first conductive layer, a second active layer, a second conductive layer and a third conductive layer. The first active layer may be located on a side of the base substrate 1. The first active layer includes a first active portion 21, and the first active portion 21 is used to form a channel region of the drive transistor DT; the first conductive layer may be located on a side of the first active layer away from the base substrate 1. The first conductive layer may include a first conductive portion 31, an orthographic projection of which on the base substrate covers an orthographic projection of the first active portion 21 on the base substrate, and the first conductive portion 31 is used to form the gate of the drive transistor DT. The second active layer may be located on a side of the first conductive layer away from the base substrate 1, and the second active layer may include a second active portion 42, a third active portion 43, a fourth active portion 44, a fifth active portion 45 and a sixth active portion 46. An orthographic projection of the second active portion 42 on the base substrate may be located on a side of an orthographic projection of the first conductive portion 31 on the base substrate in a first direction Y1; an orthographic projection of the third active portion 43 on the base substrate may be located on a side of an orthographic projection of the first conductive portion 31 on the base substrate in the first direction Y1, and the orthographic projection of the third active portion 43 on the base substrate may be located on a side of the orthographic projection of the second active portion 42 on the base substrate in a second direction X1. The first direction Y1 intersects the second direction X1. For example, the first direction Y1 is perpendicular to the second direction X1. The fourth active portion 44 is connected between the second active portion 42 and the third active portion 43, and an orthographic projection of the fourth active portion 44 on the base substrate may be located on a side of an orthographic projection of the third active portion 43 on the base substrate in a third direction X2. The second direction X1 is opposite to the third direction X2, and in the first direction Y1, the orthographic projection of the fourth active portion 44 on the base substrate may be located between the orthographic projection of the first conductive portion 31 on the base substrate and the orthographic projection of the second active portion 42 on the base substrate. The fifth active portion 45 may be connected to the second active portion 42, and an orthographic projection of the fifth active portion 45 on the base substrate may be located on a side of the orthographic projection of the second active portion 42 on the base substrate in the first direction Y1. The sixth active portion 46 may be connected to the third active portion 43, and an orthographic projection of the sixth active portion 46 on the base substrate may be located on a side of the orthographic projection of the third active portion 43 on the base substrate in the second direction X1. The second conductive layer may be disposed on a side of the second active layer away from the base substrate. The second conductive layer may include a first grid line 51 and a first protrusion 52, wherein the first grid line 51 may be used to provide the reset signal terminal in FIG. 2. An orthographic projection of the first grid line 51 on the base substrate extends in the second direction X1. The first grid line 51 may include a second conductive portion 512, an orthographic projection of which on the base substrate may coincide with the orthographic projection of the second active portion 42 on the base substrate, and the second conductive portion 512 may be used to form the first gate of the second transistor T2; the first protrusion 52 may be connected to the first grid line 51. In the first direction, an orthographic projection of the first protrusion 52 on the base substrate may be located between the orthographic projection of the first grid line 51 on the base substrate and the orthographic projection of the first conductive portion 31 on the base substrate. The first protrusion 52 may include a third conductive portion 523, an orthographic projection of which on the base substrate may be coincide with the orthographic projection of the third active portion 43 on the base substrate. The third conductive portion 523 may be used to form the first gate of the first transistor T1. The first active layer may be formed of low-temperature polysilicon material, and the second active layer may be formed of indium gallium zinc oxide (IGZO) material.

As shown in FIGS. 8 and 11, the display panel may further include a fourth conductive layer, and the fourth conductive layer is disposed between the first conductive layer and the second active layer. The fourth conductive layer may include a second grid line 81 and a second protrusion 82, wherein the second grid line 81 may provide the reset signal terminal in FIG. 2, and the second grid line 81 may be connected to the first grid line 51 by a via hole in a wiring area at the periphery of the display panel. An orthographic projection of the second grid line 81 on the base substrate extends along the second direction X1. The second grid line 81 may include a fourth conductive portion 814, and an orthographic projection of the second active portion 42 on the base substrate may be located on an orthographic projection of the fourth conductive portion 814 on the base substrate. The fourth conductive portion 814 may be used to form the second gate of the second transistor T2; the second protrusion 82 may be connected to the second grid line 81. In the first direction Y1, an orthographic projection of the second protrusion 82 on the base substrate may be located between the orthographic projection of the second grid line 81 on the base substrate and the orthographic projection of the first conductive portion 31 on the base substrate. The second protrusion 82 may include a fifth conductive portion 825, and the orthographic projection of the third active portion 43 on the base substrate may be located on an orthographic projection of the fifth conductive portion 825 on the base substrate, and the fifth conductive portion 825 may be used to form the second gate of the first transistor T1.

As shown in FIGS. 8 and 11, the fourth conductive layer may further include a sixth conductive portion 86, and an orthographic projection of the sixth conductive portion 86 on the base substrate covers the orthographic projection of the first conductive portion on the base substrate. The sixth conductive portion 86 may be used to form an electrode of the capacitor C. An opening 861 may be provided on the sixth conductive portion 86.

As shown in FIGS. 7, 12 and 13, the third conductive layer may be disposed on a side of the second conductive layer away from the base substrate, and the third conductive layer may include a first connection portion 61 and an initial signal line 62. The initial signal line 62 may be used to provide the initial signal terminal in FIG. 2. The first connecting portion 61 may be connected to the sixth active portion 46 through a via hole 71, and the first connecting portion 61 may also be connected to the first conductive portion 31 through a via hole 78, so that a connection between the gate of the drive transistor DT and the first electrode of the first transistor T1 may be achieved. An orthographic projection of the via hole 78 on the base substrate is located in an orthographic projection of the opening 861 on the sixth conductive portion 86 on the base substrate, that is, there is a distance between an edge of the orthographic projection of the via hole 78 on the base substrate and an edge of the orthographic projection of the opening 861 on the base substrate, so that the conductive material filled in the via hole 78 may be insulated from the sixth conductive portion 86.

As shown in FIGS. 7, 12 and 13, an orthographic projection of the initial signal line 62 on the base substrate may extend in the second direction X1, and the orthographic projection of the initial signal line 62 on the base substrate may be located on a side of the orthographic projection of the first grid line 51 on the base substrate in the first direction Y1, wherein the initial signal line 62 may provide the initial signal terminal in FIG. 2, and the initial signal line 62 may be connected to the fifth active portion 45 by the via hole 72 so as to realize a connection between the second electrode of the second transistor T2 and the initial signal terminal.

In this exemplary embodiment, as shown in FIGS. 9 and 11, in the first direction Y1, the orthographic projections of the fourth active portion 44 and the sixth active portion 46 on the base substrate may be located between the orthographic projection of the first conductive portion 31 on the base substrate and the orthographic projection of the first grid line 51 on the base substrate. The fourth active portion 44 may be connected to the drive transistor by a conductive structure between the first conductive portion 31 and the first grid line 51. The sixth active portion 46 may be connected to the first conductive portion 31 by a conductive structure between the first grid line 51 and the first conductive portion 31, so that the pixel drive circuit of the display panel has a higher degree of integration. In addition, each of the first transistor T1 and the second transistor T2 adopt a double-gate structure. The first grid line 51 and the second grid line 81 may provide gate voltages to the first transistor T1 and the second transistor T2 at the same time. This arrangement may increase the response speeds of the first transistor T1 and the second transistor T2, and the gates of the first transistor T1 and the second transistor T2 located in the fourth conductive layer may have a block effect on the channel regions thereof, thereby avoiding light from affecting characteristics of the channel regions of the first transistor T1 and the second transistor T2, improving the electrical stability of the first transistor T1 and the second transistor T2. It should be understood that, in other exemplary embodiments, the display panel may not be provided with the second grid line 81.

Figure 6:
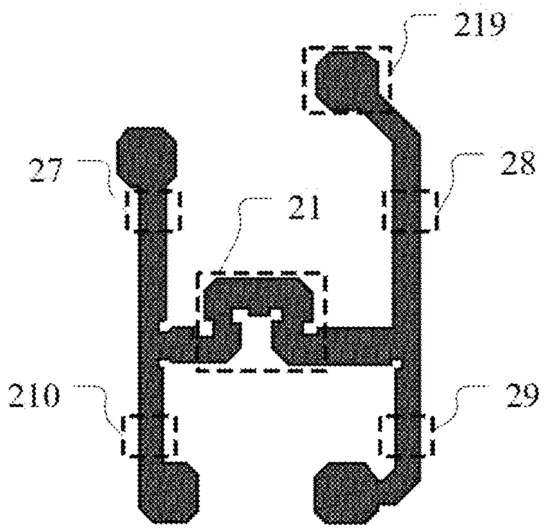
FIG. 6 is a structural layout of a first active layer in an exemplary embodiment of a display panel of the present disclosure.
Figure 7:
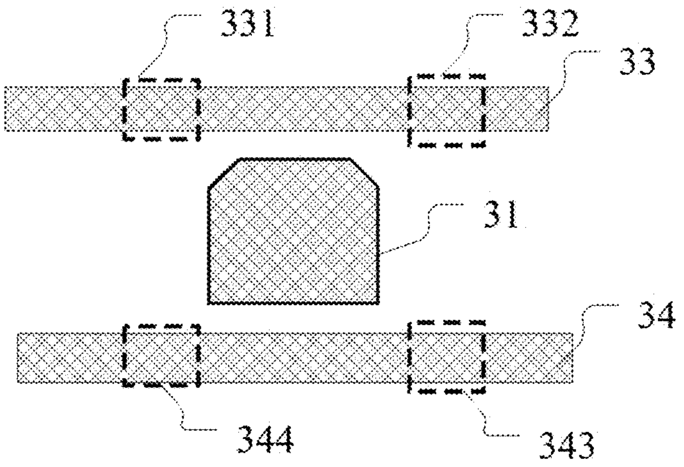
FIG. 7 is a structural layout of a first conductive layer in an exemplary embodiment of the display panel of the present disclosure.

In this exemplary embodiment, as shown in FIGS. 6, 7 and 11, the first active layer may further include a seventh active portion 27 and an eighth active portion 28. The seventh active portion 27 may be used to form the channel region of the fifth transistor T5. In the first direction Y1, an orthographic projection of the seventh active portion 27 on the base substrate may be located between the orthographic projection of the first conductive portion 31 on the base substrate and the orthographic projection of the fourth active portion 44 on the base substrate. The eighth active portion 28 may be used to form the channel region of the sixth transistor T6. In the first direction Y1, an orthographic projection of the eighth active portion 28 on the base substrate may be located between the orthographic projection of the first conductive portion 31 on the base substrate and the orthographic projection of the fourth active portion 44 on the base substrate. The first conductive layer may further include a third grid line 33, an orthographic projection of the third grid line 33 on the base substrate may extend in the second direction X1, and the third grid line 33 may be used to provide the enable signal terminal in FIG. 2. The third grid line 33 may include a first gate portion 331 and a second gate portion 332. An orthographic projection of the first gate portion 331 on the base substrate may cover the seventh active portion 27, and an orthographic projection of the second gate portion 332 on the base substrate may cover the orthographic projection of the eighth active portion 28 on the base substrate. The first gate portion 331 may be used to form the gate of the fifth transistor T5, and the second gate portion 332 may be used to form the gate of the sixth transistor.

In this exemplary embodiment, as shown in FIGS. 6, 7 and 11, the first active layer may further include a ninth active portion 29 and a tenth active portion 210, and the ninth active portion 29 is used to form the channel region of the third transistor T3. An orthographic projection of the ninth active portion 29 on the base substrate may be located on a side of the orthographic projection of the first conductive portion 31 on the base substrate in the fourth direction Y2. The fourth direction Y2 is opposite to the first direction Y1. The tenth active portion 210 is used to form the channel region of the fourth transistor T4. An orthographic projection of the tenth active portion 210 on the base substrate may be located on a side of the orthographic projection of the first conductive portion 31 on the base substrate in the fourth direction Y2. The first conductive layer may further include a fourth grid line 34. An orthographic projection of the fourth grid line 34 on the base substrate may extend in the second direction X1. The fourth grid line 34 may include a third gate portion 343 and a fourth grid portion 344. An orthographic projection of the third grid portion 343 on the base substrate may cover the orthographic projection of the ninth active portion 29 on the base substrate, and an orthographic projection of the fourth grid portion 344 on the base substrate may cover the orthographic projection of the tenth active portion 210 on the base substrate. The third gate portion 343 may be used to form the gate of the third transistor T3, and the fourth gate portion 344 may be used to form the gate of the fourth transistor T4.

In this exemplary embodiment, as shown in FIGS. 12 and 13, the third conductive layer further includes a third connection portion 63, a fourth connection portion 64 and a fifth connection portion 65. The third connecting portion 63 is connected to the fourth active portion 44 through a via hole 73, and is connected to the active portion 219 on a side of the eighth active portion through a via hole 74, so as to connect the second electrode of the first transistor T1 and the second electrode of the sixth transistor T6. The third connecting portion 63 may also be connected to the fourth active portion 44 through a plurality of via holes. For example, the third connecting portion 63 may be connected to the fourth active portion 44 through two via holes. The fourth connecting portion 64 may be connected to a side of the seventh active portion 27 through a via hole 75, and the fourth connecting portion 64 may also be connected to the sixth conductive portion 86 through a via hole 77, thereby connecting the first electrode of the fifth transistor T5 and an electrode of the capacitor C. The fifth connecting portion 65 is connected to a side of the ninth active portion through a via hole 76 to connect to the first electrode of the third transistor T3. It should be understood that the first connection portion 61, the third connection portion 63, the fourth connection portion 64 and the fifth connection portion 65 may also be located on other conductive layers as transfer layers. For example, the first connecting portion 61 may also be located on any one of the second conductive layer and the fifth conductive layer; the third connecting portion 63 may also be located on any one of the first conductive layer, the second conductive layer, the fourth conductive layer and the fifth conductive layer; the fourth connecting portion 64 may also be located on the second conductive layer; the fifth connecting portion 65 may also be located on any one of the second conductive layer and the fourth conductive layer.

As shown in FIGS. 14 and 15, the display panel may further include a fifth conductive layer, and the fifth conductive layer may be disposed on a side of the third conductive layer away from the base substrate. The fifth conductive layer may include a first power cord 91, a first shielding portion 92, a first data line 93 and a second shielding portion 94. An orthographic projection of the first power cord 91 on the base substrate may extend in the first direction Y1 and include a first edge 911; the first shielding portion 92 is connected to the power supply line 91, and the first shielding portion 92 includes a second edge 922 connected to the first edge 911 of the first power cord 91. An angle between an orthographic projection of the first edge 911 on the base substrate and an orthographic projection of the second edge 922 on the base substrate is less than 180°. That is, an orthographic projection of the first shielding portion 92 on the base substrate is located on a side of the orthographic projection of the first power cord 91 on the base substrate. As shown in FIGS. 14 and 15, the orthographic projection of the first shielding portion 92 on the base substrate may be located on a side of the orthographic projection of the first power cord 91 on the base substrate in the third direction X2. In this exemplary embodiment, the orthographic projection of the first shielding portion 92 on the base substrate may cover the orthographic projection of the third active portion 43 on the base substrate. The first shielding portion 92 may avoid the influence of light on the characteristics of the channel region of the first transistor T1, so as to improve the electrical stability of the first transistor T1. An orthographic projection of the first data line 93 on the base substrate may extend in the first direction Y1 and includes a third edge 933. The second shielding portion 94 may be connected to the data line 93, and the second shielding portion 94 may include a fourth edge 944 connected to the third edge 933 of the first data line. An angle between an orthographic projection of the third edge 933 on the base substrate and an orthographic projection of the fourth edge 944 on the base substrate is less than 180°. That is, the second shielding portion 94 may be located on a side of the orthographic projection of the data line 93 on the base substrate. As shown in FIGS. 14 and 15, an orthographic projection of the second shielding portion 94 on the base substrate may be located on a side of the orthographic projection of the data line 93 on the base substrate in the second direction X1. The orthographic projection of the second shielding portion 944 on the base substrate covers the orthographic projection of the second active portion 42 on the base substrate. The second shielding portion 944 may prevent the influence of light on the characteristics of the channel region of the second transistor T2, so as to improve the electrical stability of the second transistor T2. The first power cord 91 may provide the first power supply terminal in FIG. 2, and the data line 93 may provide the data signal terminal in FIG. 2. The first power cord 91 may be connected to the fourth connection portion 64 through a via hole 79 to connect the first electrode of the fifth transistor T5. The data line 93 may be connected to the fifth connection portion 65 through a via hole 710 to connect the first electrode of the third transistor. As shown in FIGS. 14 and 15, the fifth conductive layer may further include a connecting portion 99. The connecting portion 99 may be connected to the third connecting portion 63 through a via hole 716, and the connecting portion 99 may also be connected to the anode of the light-emitting unit through a via hole, so that the second electrode of the sixth transistor T6 is connected to the anode of the light-emitting unit.

It should be understood that in other exemplary embodiments, the fifth conductive layer may further include a shielding layer connected to the first power cord 91, and an orthographic projection of the shielding layer on the base substrate may cover the orthographic projection of the first conductive portion 31 on the base substrate. The shielding layer may shield the influence of other signals on the gate voltage of the drive transistor.

Figure 16:
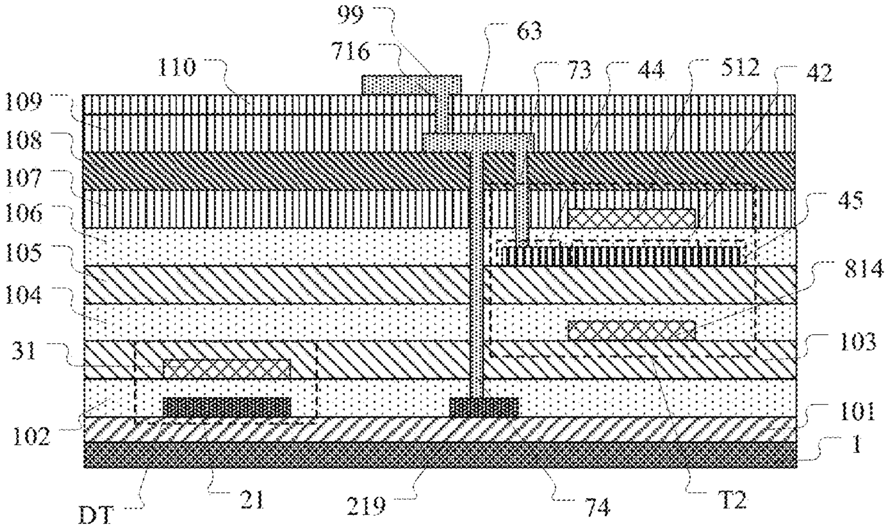
FIG. 16 is a partial cross-sectional view taken along the dashed line AA in FIG. 15.

As shown in FIG. 16, it is a partial cross-sectional view taken along the dashed line AA in FIG. 15. The display panel also includes a barrier layer 101, a first gate insulating layer 102, a second gate insulating layer 103, a third gate insulating layer 104, a buffer layer 105, a fourth gate insulating layer 106, a first dielectric layer 107, a second dielectric layer 108, a passivation layer 109 and a first planarization layer 110. The base substrate 1, the barrier layer 101, the first active layer, the first gate insulating layer 102, the first conductive layer, the second gate insulating layer 103, the fourth conductive layer, the third gate insulating layer 104, the buffer layer 105, the second active layer, the fourth gate insulating layer 106, the second conductive layer, the first dielectric layer 107, the second dielectric layer 108, the third conductive layer, the passivation layer 109, the first planarization layer 110 and the fifth conductive layer are stacked in sequence. The third connecting portion 63 may be connected to the fourth active portion 44 through the via hole 73, and may be connected to the active portion 219 through the via hole 74. The connecting portion 99 in the fifth conductive layer may be connected to the third connecting portion 63 through a via hole 716, and the connecting portion 99 may also be connected to an anode layer on a side of the fifth conductive layer away from the base substrate through the via hole so as to connect the anode of the light-emitting unit. A second planarization layer may also be provided between the fifth conductive layer and the anode layer.

The material of the dielectric layer and the passivation layer may be inorganic materials, such as at least one of silicon nitride, silicon oxide, and silicon oxynitride or a combination thereof, or organic materials, such as transparent polyimide (CPI), polyimide (PI), polyethylene terephthalate (PET), polyethylene naphthalate (PEN), etc.

The material of the conductive layer may also be at least one of copper, molybdenum, titanium, aluminum, nickel, silver, indium tin oxide (ITO), or a combination thereof, or an alloy material of the above materials, or a lamination, for example, titanium/aluminum/titanium triple layer.

The barrier layer and the buffer layer may be made of inorganic materials, for example, including at least one of silicon nitride, silicon oxide, and silicon oxynitride or a combination thereof.

The material of the planarization layer may be an organic material, such as transparent polyimide (CPI), polyimide (PI), polyethylene terephthalate (PET), polyethylene naphthalate (PEN), etc.

The material of the gate insulating layer may be an inorganic material, for example, including at least one of silicon nitride, silicon oxide, and silicon oxynitride, or a combination thereof.

It should be understood that FIG. 16 only shows the relative positions of the various layers of the display panel, and does not represent the specific structure of the display panel. In the actual structure of the display panel, the inorganic layer (including other insulating layers other than the planarization layer) formed on a raised structure will cover the raised structure in accordance with the shape. For example, the first gate insulating layer 102 will conformally cover the first active portion 21, and the third gate insulating layer 104 will conformally cover the fourth conductive portion 814.

In this exemplary embodiment, with reference to FIG. 16, the via holes 71, 72, 73 may penetrate the fourth gate insulating layer 106, the first dielectric layer 107 and the second dielectric layer 108; the via holes 74, 75, 76 may penetrate the first gate insulating layer 102, the second gate insulating layer 103, the third gate insulating layer 104, the buffer layer 105, the fourth gate insulating layer 106, the first dielectric layer 107 and the second dielectric layer 108; the via hole 77 may penetrate the third gate insulating layer 104, the buffer layer 105, the fourth gate insulating layer 106, the first dielectric layer 107 and the second dielectric layer 108; the via holes 79, 710, and 716 may penetrate the passivation layer 109 and the first planarization layer 110. It should be noted that the passivation layer 109 in the embodiment of the present disclosure may be omitted according to actual design needs, that is to say, there may be not a passivation layer 109 above the third conductive layer (including the pattern of the first connection portion 61, etc.), and the third conductive layer may be directly provided with the first planarization layer 110.

Figure 17:
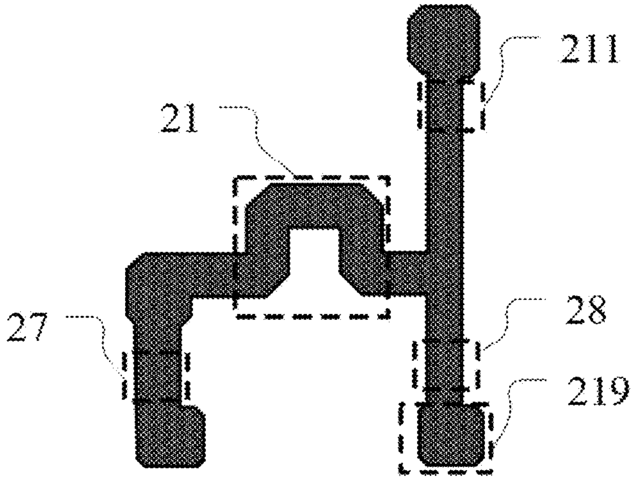
FIG. 17 is a structural layout of the first active layer in another exemplary embodiment of the display panel of the present disclosure.
Figure 18:
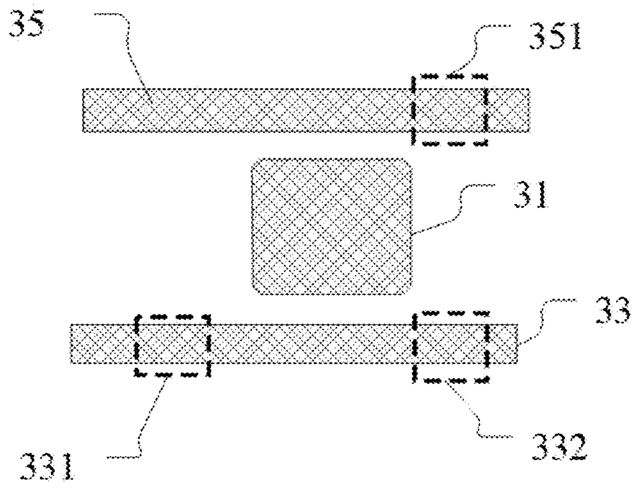
FIG. 18 is a structural layout of the first conductive layer in another exemplary embodiment of the display panel of the present disclosure.
Figure 19:
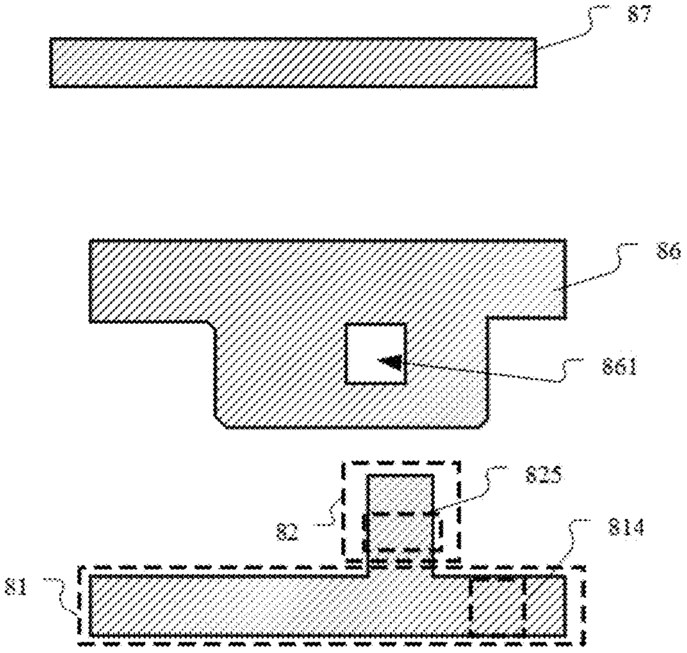
FIG. 19 is a structural layout of the fourth conductive layer in another exemplary embodiment of the display panel of the present disclosure.
Figure 20:
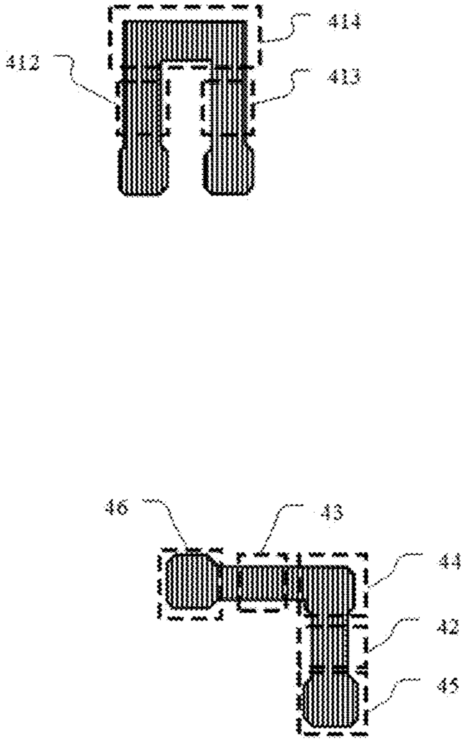
FIG. 20 is a structural layout of the second active layer in another exemplary embodiment of the display panel of the present disclosure.
Figure 21:
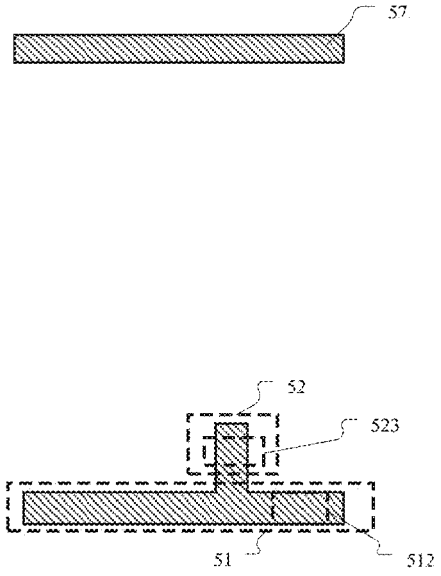
FIG. 21 is a structural layout of the second conductive layer in another exemplary embodiment of the display panel of the present disclosure.
Figure 22:
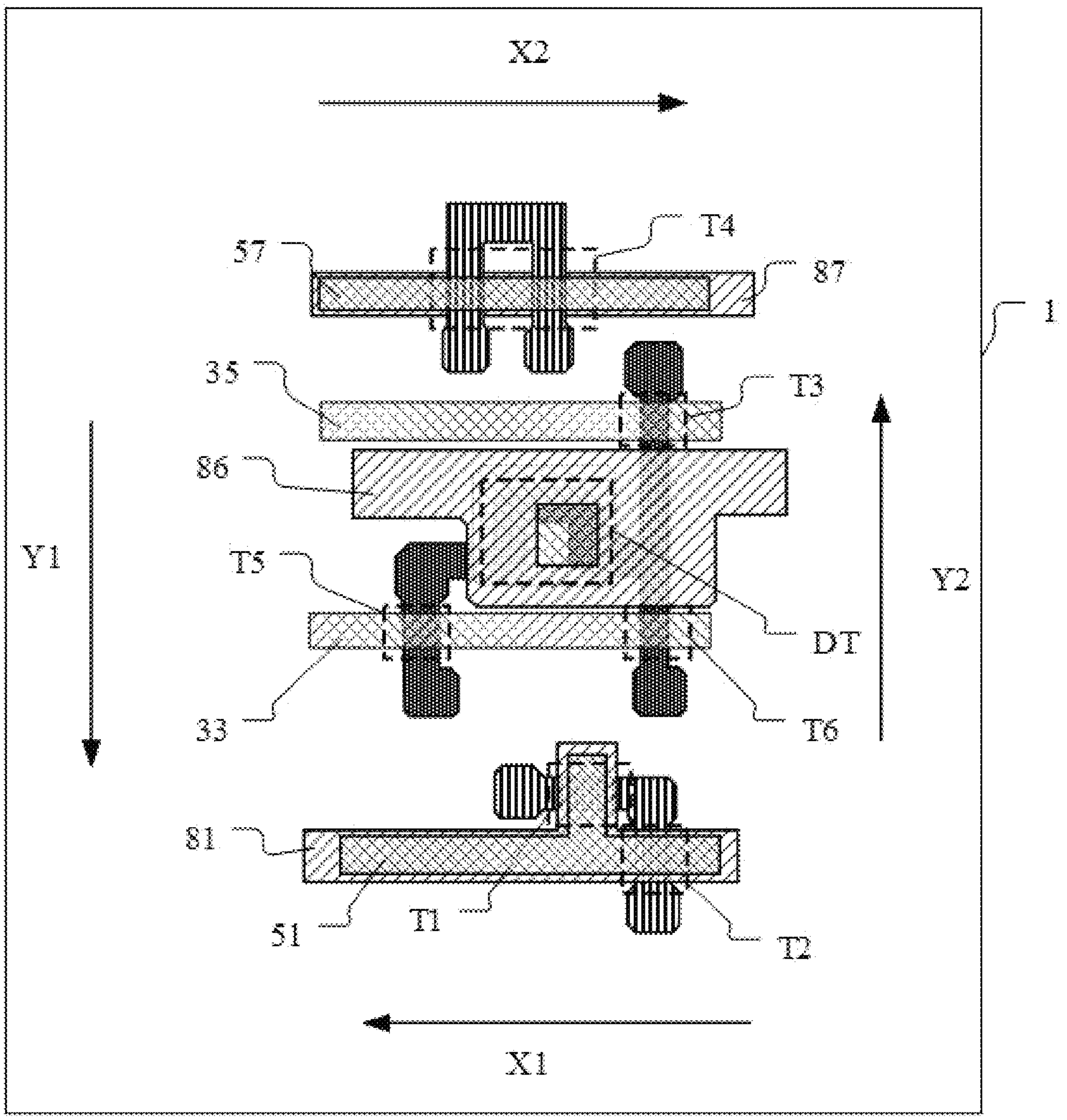
FIG. 22 is a layout diagram of a laminated structure of the first active layer, the first conductive layer, the fourth conductive layer, the second active layer and the second conductive layer in another exemplary embodiment of the display panel of the present disclosure.
Figure 23:
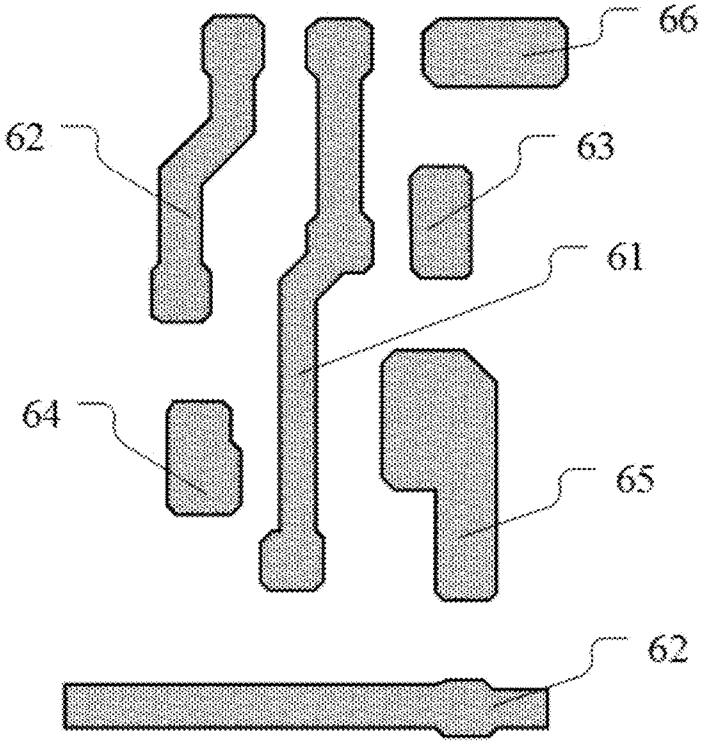
FIG. 23 is a structural layout of the third conductive layer in another exemplary embodiment of the display panel of the present disclosure.
Figure 24:
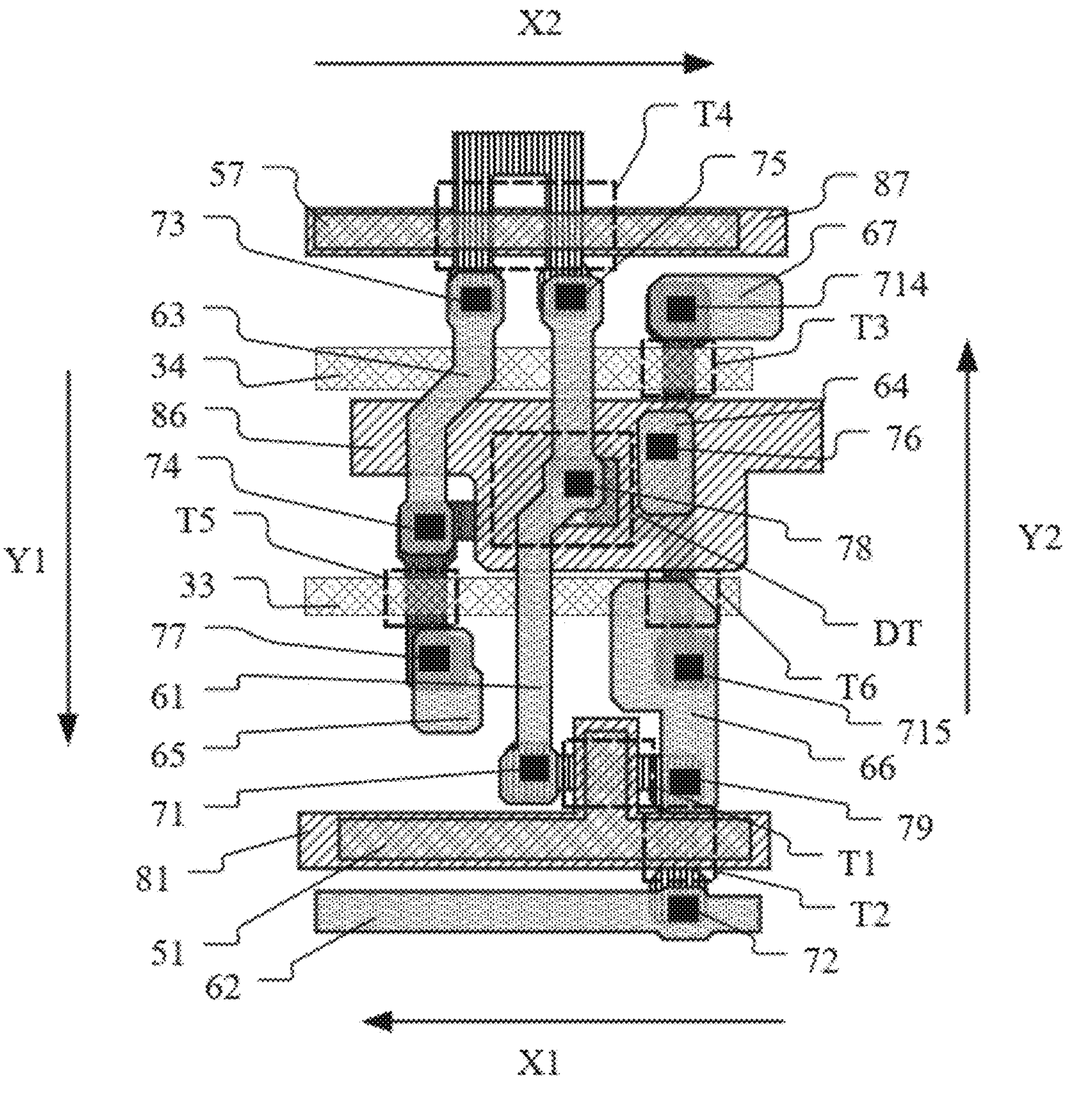
FIG. 24 is a layout view of a laminated structure of the first active layer, the first conductive layer, the fourth conductive layer, the second active layer, the second conductive layer and the third conductive layer in another exemplary embodiment of the display panel of the present disclosure.
Figure 25:
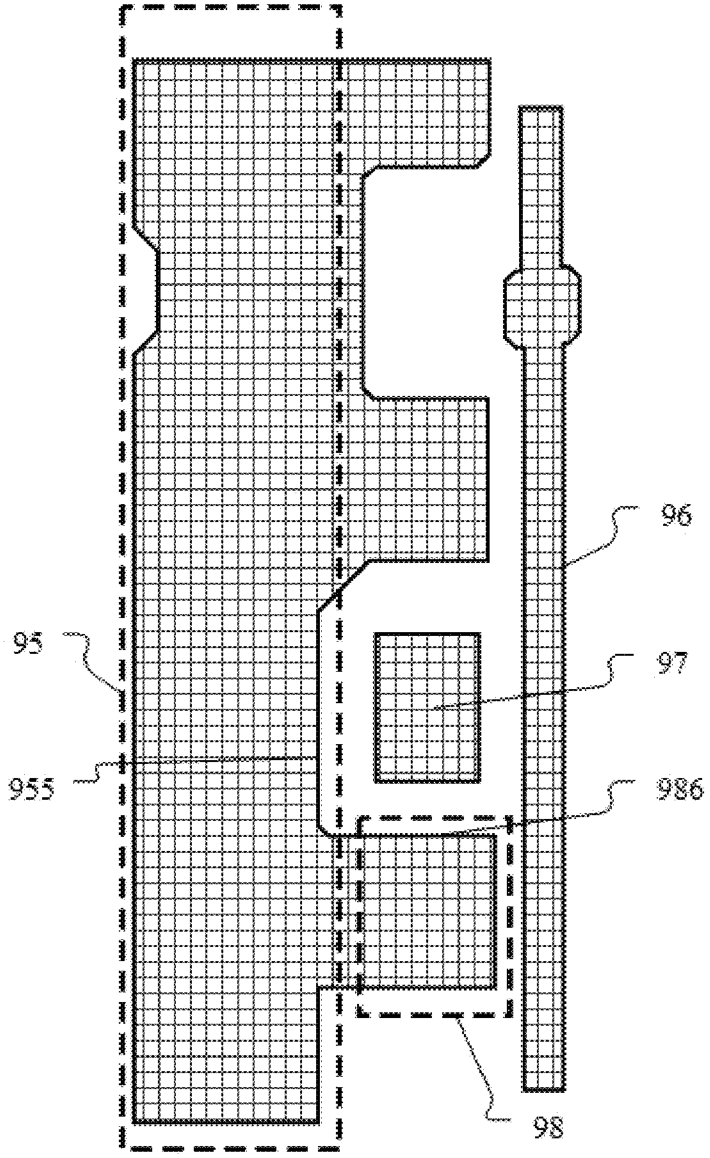
FIG. 25 is a structural layout of the fifth conductive layer in another exemplary embodiment of the display panel of the present disclosure.
Figure 26:
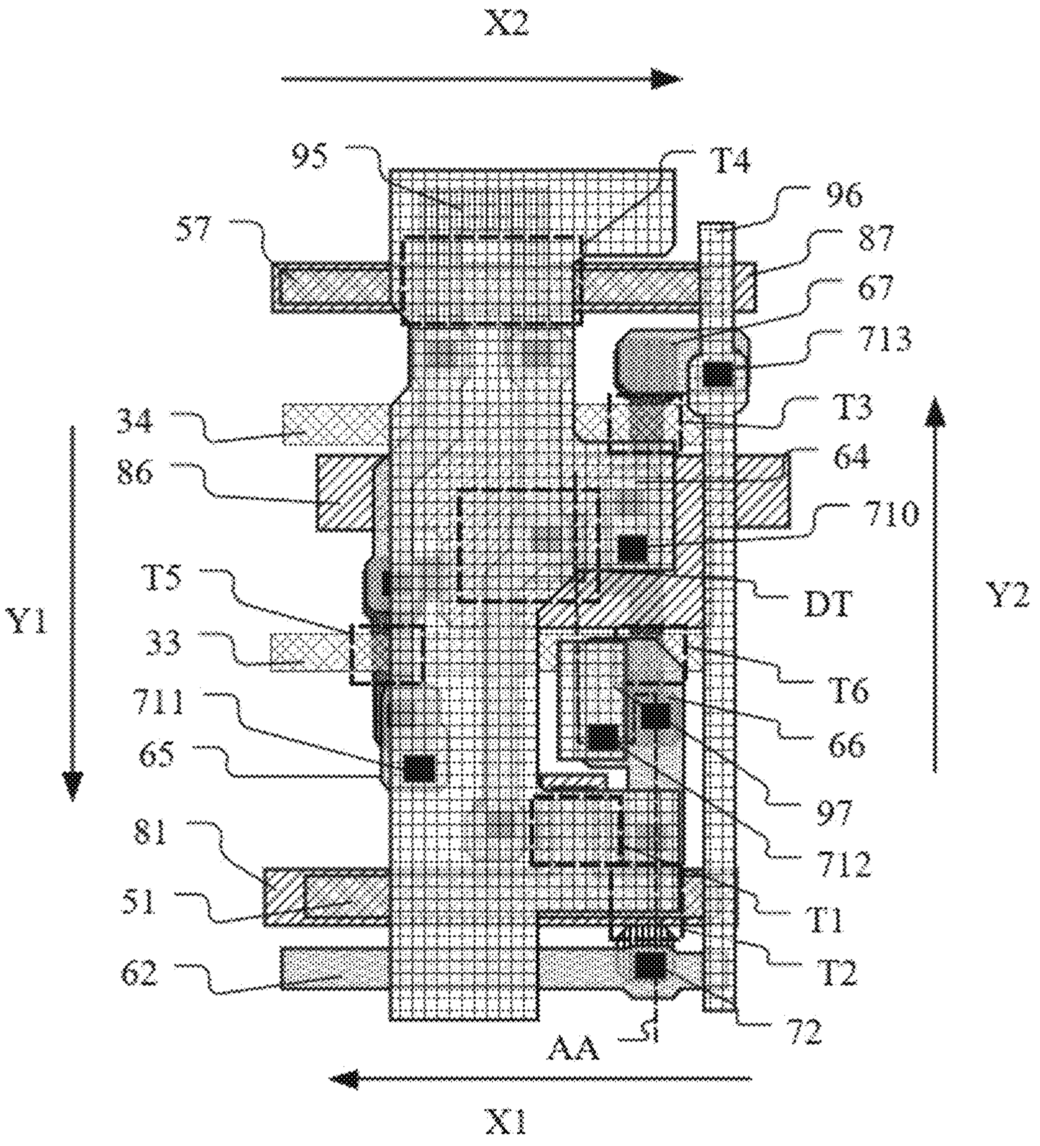
FIG. 26 is a layout diagram of a laminated structure of the first active layer, the first conductive layer, the fourth conductive layer, the second active layer, the second conductive layer, the third conductive layer and the fifth conductive layer in another exemplary embodiment of the display panel of the present disclosure.

This exemplary embodiment also provides another display panel, which may include the pixel drive circuit shown in FIG. 4, as shown in FIGS. 17-26. FIG. 17 is a structural layout of the first active layer in another exemplary embodiment of the display panel of the present disclosure; FIG. 18 is a structural layout of the first conductive layer in another exemplary embodiment of the display panel of the present disclosure; FIG. 19 is a structural layout of the fourth conductive layer in another exemplary embodiment of the display panel of the present disclosure; FIG. 20 is a structural layout of the second active layer in another exemplary embodiment of the display panel of the present disclosure; FIG. 21 is a structural layout of the second conductive layer in another exemplary embodiment of the display panel of the present disclosure; FIG. 22 is a layout diagram of a laminated structure of the first active layer, the first conductive layer, the fourth conductive layer, the second active layer and the second conductive layer in another exemplary embodiment of the display panel of the present disclosure; FIG. 23 is a structural layout of the third conductive layer in another exemplary embodiment of the display panel of the present disclosure; FIG. 24 is a layout view of a laminated structure of the first active layer, the first conductive layer, the fourth conductive layer, the second active layer, the second conductive layer, and the third conductive layer in another exemplary embodiment of the display panel of the present disclosure; FIG. 25 is a structural layout of the fifth conductive layer in another exemplary embodiment of the display panel of the present disclosure; FIG. 26 is a layout diagram of a laminated structure of the first active layer, the first conductive layer, the fourth conductive layer, the second active layer, the second conductive layer, the third conductive layer and the fifth conductive layer in another exemplary embodiment of the display panel of the present disclosure.

As shown in FIGS. 17-24, the display panel may include a base substrate 1, a first active layer, a first conductive layer, a second active layer, a second conductive layer and a third conductive layer. The first active layer may be located on a side of the base substrate 1. The first active layer may include a first active portion 21, and the first active portion 21 is used to form a channel region of the drive transistor DT; the first conductive layer may be located on a side of the first active layer away from the base substrate 1. The first conductive layer may include a first conductive portion 31, an orthographic projection of which on the base substrate covers an orthographic projection of the first active portion 21 on the base substrate, and the first conductive portion 31 is used to form the gate of the drive transistor DT. The second active layer may be located on a side of the first conductive layer away from the base substrate 1, and the second active layer may include a second active portion 42, a third active portion 43, and a fourth active portion 44, the fifth active portion 45 and the sixth active portion 46. An orthographic projection of the second active portion 42 on the base substrate may be located on a side of an orthographic projection of the first conductive portion 31 on the base substrate in a first direction Y1; in the first direction Y1, an orthographic projection of the third active portion 43 on the base substrate may be located between the orthographic projection of the first conductive portion 31 on the base substrate and the orthographic projection of the second active portion 42 on the base substrate, and the orthographic projection of the third active portion 43 on the base substrate may be located on a side of the orthographic projection of the second active portion 42 on the base substrate in a second direction X1. The first direction Y1 intersects the second direction X1. For example, the first direction Y1 is perpendicular to the second direction X1. The fourth active portion 44 is connected between the second active portion 42 and the third active portion 43, and an orthographic projection of the fourth active portion 44 on the base substrate may be located on a side of the orthographic projection of the third active portion 43 on the base substrate in a third direction X2. The second direction X1 is opposite to the third direction X2. In the first direction Y1, the orthographic projection of the fourth active portion 44 on the base substrate may be located between the orthographic projection of the first conductive portion 31 on the base substrate and the orthographic projection of the second active portion 42 on the base substrate. The fifth active portion 45 may be connected to the second active portion 42, and an orthographic projection of the fifth active portion 45 on the base substrate may located on a side of the orthographic projection of the second active portion 42 on the base substrate in the first direction Y1. The sixth active portion 46 may be connected to the third active portion 43, and an orthographic projection of the sixth active portion 46 on the base substrate may be located on a side of the orthographic projection of the third active portion 43 on the base substrate in the second direction X1. The second conductive layer may be disposed on a side of the second active layer away from the base substrate. The second conductive layer may include a first grid line 51 and a first protrusion 52, wherein the first grid line 51 may be used to provide the reset signal terminal in FIG. 4. An orthographic projection of the first grid line 51 on the base substrate extends in the second direction X1. The first grid line 51 may include a second conductive portion 512, an orthographic projection of which on the base substrate may coincide with the orthographic projection of the second active portion 42 on the base substrate, and the second conductive portion 512 may be used to form the first gate of the second transistor T2; the first protrusion 52 may be connected to the first grid line 51. In the first direction Y1, an orthographic projection of the first protrusion 52 on the base substrate may be located between the orthographic projection of the first grid line 51 on the base substrate and the orthographic projection of the first conductive portion 31 on the base substrate. The first protrusion 52 may include a third conductive portion 523, an orthographic projection of which on the base substrate may be coincide with the orthographic projection of the third active portion 43 on the base substrate. The third conductive portion 523 may be used to form the first gate of the first transistor T1. The first active layer may be formed of low-temperature polysilicon material, and the second active layer may be formed of indium gallium zinc oxide material.

As shown in FIGS. 19 and 22, the display panel may further include a fourth conductive layer, and the fourth conductive layer is disposed between the first conductive layer and the second active layer. The fourth conductive layer may include a second grid line 81 and a second protrusion 82, wherein the second grid line 81 may provide the reset signal terminal in FIG. 2, and the second grid line 81 may be connected to the first grid line 51 by a via hole in a wiring area at the periphery of the display panel. An orthographic projection of the second grid line 81 on the base substrate extends along the second direction X1. The second grid line 81 may include a fourth conductive portion 814, and an orthographic projection of the second active portion 42 on the base substrate may be located on an orthographic projection of the fourth conductive portion 814 on the base substrate. The fourth conductive portion 814 may be used to form the second gate of the second transistor T2; the second protrusion 82 may be connected to the second grid line 81. In the first direction Y1, an orthographic projection of the second protrusion 82 on the base substrate may be located between the orthographic projection of the second grid line 81 on the base substrate and the orthographic projection of the first conductive portion 31 on the base substrate. The second protrusion 82 may include a fifth conductive portion 825, and the orthographic projection of the third active portion 43 on the base substrate may be located on an orthographic projection of the fifth conductive portion 825 on the base substrate, and the fifth conductive portion 825 may be used to form the second gate of the first transistor T1.

As shown in FIGS. 19 and 22, the fourth conductive layer may further include a sixth conductive portion 86, and an orthographic projection of the sixth conductive portion 86 on the base substrate covers the orthographic projection of the first conductive portion 31 on the base substrate. The sixth conductive portion 86 may be used to form an electrode of the capacitor C. An opening 861 may be provided on the sixth conductive portion 86.

As shown in FIGS. 23 and 24, the third conductive layer may be disposed on a side of the second conductive layer away from the base substrate, and the third conductive layer may include a first connection portion 61 and an initial signal line 62. The initial signal line 62 may be used to provide the initial signal terminal in FIG. 4. The first connecting portion 61 may be connected to the sixth active portion 46 through a via hole 71, and the first connecting portion 61 may also be connected to the first conductive portion 31 through a via hole 78, so that a connection between the gate of the drive transistor DT and the first electrode of the first transistor T1 may be achieved. An orthographic projection of the via hole 78 on the base substrate is located in an orthographic projection of an opening 861 on the sixth conductive portion 86 on the base substrate, that is, there is a distance between an edge of the orthographic projection of the via hole 78 on the base substrate and an edge of an orthographic projection of an opening 861 on the base substrate, so that the conductive material filled in the via hole 78 may be insulated from the sixth conductive portion 86.

An orthographic projection of the initial signal line 62 on the base substrate may extend in the second direction X1, and the orthographic projection of the initial signal line 62 on the base substrate may be located on a side of the orthographic projection of the first grid line 51 on the base substrate in the first direction Y1. The initial signal line 62 may provide the initial signal terminal in FIG. 4, and the initial signal line 62 may be connected to the fifth active portion 45 by a via hole 72 so as to realize a connection between the first electrode of the second transistor T2 and the initial signal terminal.

In this exemplary embodiment, in the first direction Y1, the orthographic projections of the fourth active portion 44 and the sixth active portion 46 on the base substrate may be located between the orthographic projection of the conductive portion 31 on the base substrate and the orthographic projection of the first grid line 51 on the base substrate. The fourth active portion 44 may be connected to the drive transistor by a conductive structure between the first conductive portion 31 and the first grid line 51. The sixth active portion 46 may be connected to the first conductive portion 31 by a conductive structure between the first grid line 51 and the first conductive portion 31, so that the pixel drive circuit of the display panel has a high degree of integration. In addition, each of the first transistor T1 and the second transistor T2 adopts a double-gate structure. Two gates of the first transistor T1 and the second transistor T2 may provide gate voltages at the same time, which may increase the response speeds of the first transistor T1 and the second transistor T2, and the gates of the first transistor T1 and the second transistor T2 located in the fourth conductive layer may have a block effect on the channel regions thereof, thereby avoiding light from affecting characteristics of the channel regions of the first transistor T1 and the second transistor T2, improving the electrical stability of the first transistor T1 and the second transistor T2. It should be understood that, in other exemplary embodiments, the display panel may not be provided with the second grid line 81.

In this exemplary embodiment, as shown in FIGS. 17, 18 and 22, the first active layer may further include a seventh active portion 27 and an eighth active portion 28. The seventh active portion 27 may be used to form the channel region of the fifth transistor T5. In the first direction Y1, an orthographic projection of the seventh active portion 27 on the base substrate may be located between the orthographic projection of the first conductive portion 31 on the base substrate and the orthographic projection of the fourth active portion 44 on the base substrate. The eighth active portion 28 may be used to form the channel region of the sixth transistor T6. In the first direction Y1, an orthographic projection of the eighth active portion 28 on the base substrate may be located between the orthographic projection of the first conductive portion 31 on the base substrate and the orthographic projection of the fourth active portion 44 on the base substrate. The first conductive layer may further include a third grid line 33, an orthographic projection of the third grid line 33 on the base substrate may extend in the second direction X1, and the third grid line 33 may be used to provide the enable signal terminal in FIG. 4. The third grid line 33 may include gate portions 331 and 332. An orthographic projection of the gate portion 331 on the base substrate may cover the seventh active portion 27, and an orthographic projection of the gate portion 332 on the base substrate may cover the orthographic projection of the eighth active portion 28 on the base substrate. The gate portion 331 may be used to form the gate of the fifth transistor T5, and the gate portion 332 may be used to form the gate of the sixth transistor.

The first active layer further includes an eleventh active portion 211. The eleventh active portion 211 is used to form the channel region of the third transistor T3, and an orthographic projection of the eleventh active portion 211 on the base substrate is located on a side of the orthographic projection of the first conductive portion 31 on the base substrate in the fourth direction Y2, and the fourth direction Y2 is opposite to the first direction YT; the first conductive layer may further include a fifth grid line 35, an orthographic projection of which on the base substrate extends in the second direction X1. The fifth grid line 35 may include a gate portion 351, and an orthographic projection of the gate portion 351 on the base substrate covers the eleventh active portion 211, and the gate portion 351 may be used to form the gate of the third transistor T3.

As shown in FIGS. 19, 20, 21 and 22, the fourth conductive layer may further include a sixth grid line 87, and an orthographic projection of the sixth grid line 87 on the base substrate may extend in the second direction X1. The orthographic projection of the sixth grid line 87 on the base substrate may be located on a side of the orthographic projection of the fifth grid line 35 on the base substrate in the fourth direction Y2. The second active layer may further include a twelfth active portion 412, a thirteenth active portion 413 and a fourteenth active portion 414. The twelfth active portion 412 may be used to form the first channel region of the fourth transistor T4, and an orthographic projection of the twelfth active portion 412 on the base substrate may be located on an orthographic projection of the sixth grid line 87 on the base substrate; the thirteenth active portion 413 is used to form the second channel region of the fourth transistor T4, and an orthographic projection of the thirteenth active portion 413 on the base substrate may be located on an orthographic projection of the sixth grid line 87 on the base substrate; the fourteenth active portion 414 may be connected between the twelfth active portion 412 and the thirteenth active portion 413, and an orthographic projection of the fourteenth active portion 414 on the base substrate may be located on a side of an orthographic projection of the sixth grid line 87 on the base substrate in the fourth direction Y2. The second conductive layer may further include a seventh grid line 57, an orthographic projection of the seventh grid line 57 on the base substrate may extend in the second direction X1. The orthographic projection of the seventh grid line 57 on the base substrate covers the orthographic projections of the twelfth active portion 412 and the thirteenth active portion 414 on the base substrate. The fourth transistor T4 has two channel regions, so that the leakage current of the third node through the fourth transistor may be further reduced. The seventh grid line 57 and the sixth grid line 87 may be connected by a via hole in the wiring area at the periphery of the display panel, and the seventh grid line 57 and the sixth grid line 87 may provide gate drive signals to the fourth transistor at the same time, so as to increase the response speed of the fourth transistor T4. The seventh grid line 57 and the sixth grid line 87 may be used to provide the second gate drive signal terminal in FIG. 4.

In this exemplary embodiment, as shown in FIGS. 23 and 24, the first connecting portion 61 is also connected to a side of the thirteenth active portion 413 away from the fourteenth active portion 414 through a via hole 75 so as to connect the second electrode of the fourth transistor T4 and the gate of the drive transistor DT. The third conductive layer further includes a connecting portion 63, a connecting portion 64, a connecting portion 65, a connecting portion 66 and a connecting portion 67. The connecting portion 63 may be connected to a side of the twelfth active portion 412 away from the fourteenth active portion 414 through a via hole 73, and at the same time connected to a side of the seventh active portion 27 through a via hole 74 so as to connect the first electrode of the fourth transistor T4 and the second electrode of the fifth transistor T5. The connecting portion 64 may be connected to the sixth conductive portion 86 through a via hole 76. The connecting portion 65 may be connected to a side of the seventh active portion 27 away from the connecting portion 62 through a via hole 77 so as to connect to the first electrode of the fifth transistor. The connecting portion 66 may be connected to the active portion 219 on a side of the eighth active portion 28 through a via hole 715, and at the same time, may be connected to the fourth active portion through a via hole 79 so as to connect the second electrode of the sixth transistor and the second electrode of the first transistor. The connecting portion 67 may be connected to one side of the eleventh active portion 211 through a via hole 714 so as to connect to the first electrode of the third transistor T3.

In this exemplary embodiment, the fourteenth active portion 414 is a conductor, and parasitic capacitances are formed between the fourteenth active portion 414 and the seventh and sixth grid lines 57, 87. When the voltages on the seventh grid line 57 and the six grid line 87 change, based on the bootstrap effect of the capacitance, the voltage of the fourteenth active portion 414 will also change accordingly, which causes an electric leakage from the fourteenth active portion 414 to the source and drain of the fourth transistor T4, leading to abnormal driving of the pixel drive circuit. As shown in FIGS. 25 and 26, the display panel may further include a fifth conductive layer, and the fifth conductive layer may be disposed on a side of the third conductive layer away from the base substrate. The fifth conductive layer also includes a second power cord 95, which may be used to provide the first power supply terminal in FIG. 4. An orthographic projection of the second power cord 95 on the base substrate may extend in the first direction Y1, and the orthographic projection of the second power cord 95 on the base substrate may cover the orthographic projection of the fourteenth active portion 414 on the base substrate. The second power cord 95 has a stable voltage, and the second power cord 95 may suppress the potential change of the fourteenth active portion 414, thereby reducing the leakage current from the fourteenth active portion 414 to the source and drain of the fourth transistor T4.

In this exemplary embodiment, as shown in FIGS. 25 and 26, the second power cord 95 may include a fifth edge 955, and the fifth conductive layer may also include a third shielding portion 98 connected to the second power cord 95. The third shielding portion 98 includes a sixth edge 986 connected to the fifth edge 955 of the second power cord 95, and an angle between an orthographic projection of the sixth edge 986 on the base substrate and an orthographic projection of the fifth edge 955 on the base substrate is less than 180°. That is, an orthographic projection of third shielding portion 98 on the base substrate is located on a side of an orthographic projection of the second power cord 95 on the base substrate. The orthographic projection of third shielding portion 98 on the base substrate covers the second active portion and the third active portion. The third shielding portion 98 may prevent the influence of light on the characteristics of the channel regions of the first transistor T1 and the second transistor T2, so as to improve the electrical stabilities of the first transistor T1 and the second transistor T2. The second power cord 95 may also be connected to the connecting portion 64 through a via hole 710. As shown in FIG. 26, in this exemplary embodiment, the orthographic projection of the second power cord 95 on the base substrate covers an orthographic projection of the first connecting portion 61 on the base substrate. It should be understood that, in other exemplary embodiments, the orthographic projection of the second power cord 95 on the base substrate may also not intersect or only partially intersect the orthographic projection of the first connecting portion 61 on the base substrate.

The fifth conductive layer may further include a data line 96 and a connecting portion 97. The data line 96 is connected to the connecting portion 67 through a via hole 713 so as to connect to the first electrode of the third transistor T3. The connecting portion 97 is connected to the connecting portion 66 through a via hole 712 so as to connect the second electrode of the sixth transistor T6, and the connecting portion 97 may be connected to the anode of the light-emitting unit through a via hole.

Figure 27:
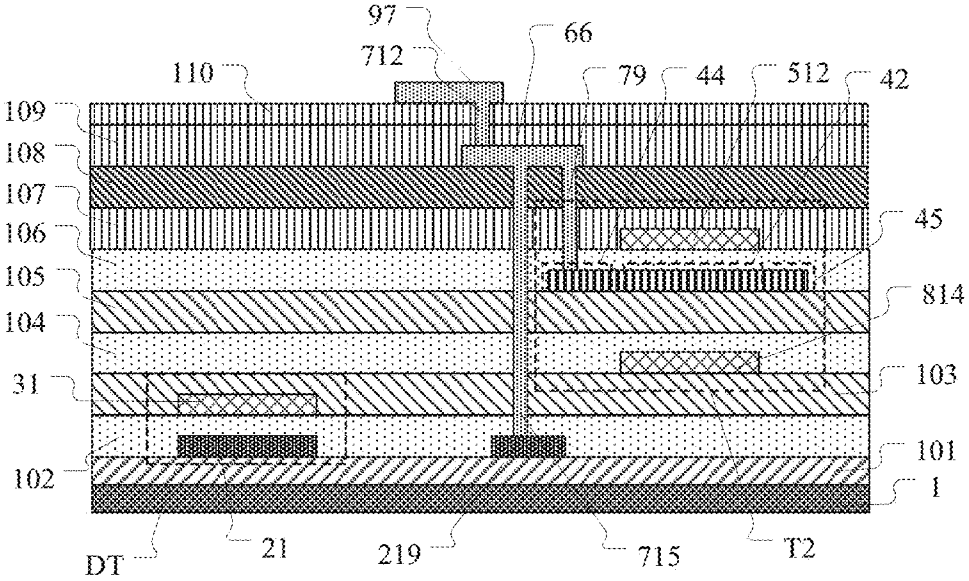
FIG. 27 is a partial cross-sectional view taken along the dashed line AA in FIG. 26.

As shown in FIG. 27, it is a partial cross-sectional view taken along the dashed line AA in FIG. 26. The display panel also includes a barrier layer 101, a first gate insulating layer 102, a second gate insulating layer 103, a third gate insulating layer 104, a buffer layer 105, a fourth gate insulating layer 106, a first dielectric layer 107, a second dielectric layer 108, a passivation layer 109 and a first planarization layer 110. The base substrate 1, the barrier layer 101, the first active layer, the first gate insulating layer 102, the first conductive layer, the second gate insulating layer 103, the fourth conductive layer, the third gate insulating layer 104, the buffer layer 105, the second active layer, the fourth gate insulating layer 106, the second conductive layer, the first dielectric layer 107, the second dielectric layer 108, the third conductive layer, the passivation layer 109, the first planarization layer 110 and the fifth conductive layer are stacked in sequence. The connecting portion 66 may be connected to the active portion 219 through a via hole 715, and may be connected to the fourth active portion 44 through a via hole 79 at the same time so as to connect the second electrode of the sixth transistor and the first electrode of the second transistor. The connecting portion 97 in the fifth conductive layer may be connected to the connecting portion 66 through a via hole 712, and the connecting portion 97 may also be connected to an anode layer on a side of the fifth conductive layer away from the base substrate through a via hole so as to connect the anode of the light-emitting unit. A second planarization layer may also be provided between the fifth conductive layer and the anode layer.

The material of the dielectric layer and the passivation layer may be silicon nitride or transparent organic resin etc., and the material of the planarization layer may also be polyimide (PI), transparent polyimide (CPI), polyethylene terephthalate (PET) and polyethylene naphthalate (PEN), etc. The material of the conductive layer may also be a metal material such as copper, molybdenum, etc. The barrier layer may be an inorganic material.

It should be understood that FIG. 27 only shows the relative positions of the various layers of the display panel, and does not represent the specific structure of the display panel. In the actual structure of the display panel, the inorganic layer (including other insulating layers other than the planarization layer) formed on the raised structure will cover the raised structure in accordance with the shape. For example, the first gate insulating layer 102 will conformally cover the first active portion 21, and the third gate insulating layer 104 will conformally cover the fourth conductive portion 814.

This exemplary embodiment also provides a driving method for a pixel drive circuit for driving the above-mentioned pixel drive circuit, and the driving method includes:

in a reset phase, turning on the first transistor and the second transistor to input an initial signal to the third node and the first electrode of the light-emitting unit through the initial signal terminal;

in a compensation phase, turning on the first node and the third node by the compensation circuit, and at the same time writing a data signal to the first node by the data writing circuit;

in a light-emitting phase, by the light-emitting control circuit, connecting the first power supply terminal and an electrode of the drive transistor and connecting the first electrode of the light-emitting unit and another electrode of the drive transistor.

The driving method has been analyzed in detail in the above content, and will not be repeated here.

Those of ordinary skill in the art will easily think of other embodiments of the present disclosure after considering the specification and practicing the disclosure disclosed herein. This application is intended to cover any variations, uses or adaptive changes of the present disclosure. These variations, uses or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the claims.

It should be understood that the present disclosure is not limited to the precise structure that has been described above and shown in the drawings, and various modifications and changes may be made without departing from its scope. The scope of the present disclosure is limited only by the appended claims.

What is claimed is:

1. A pixel drive circuit, comprising:

a drive transistor having a first electrode connected to a first node, a second electrode connected to a second node, and a gate connected to a third node;

a data writing circuit connected to the first node and a data signal terminal for transmitting a signal of the data signal terminal to the first node in response to a control signal;

a compensation circuit connecting the second node and the third node for connecting the second node and the third node in response to a control signal;

a light-emitting control circuit connected to the first electrode and the second electrode of the drive transistor, a first power supply terminal, a first electrode of a light-emitting unit, and an enable signal terminal, for connecting the first power supply terminal and an electrode of the drive transistor and connecting the first electrode of the light-emitting unit and another electrode of the drive transistor in response to a signal of the enable signal terminal; and a storage circuit connected between the first power supply terminal and the third node; and a reset circuit comprising:

a first transistor having a first electrode connected to the third node, a second electrode connected to the first electrode of the light-emitting unit, and a gate connected to a reset signal terminal; and a second transistor having a first electrode connected to the second electrode of the first transistor, a second electrode connected to an initial signal terminal, and a gate connected to the reset signal terminal;

wherein the first transistor and the second transistor are N-type oxide transistors, and the drive transistor is a P-type low-temperature polysilicon transistor, and wherein the compensation circuit comprises a fourth transistor, the fourth transistor is connected to a gate of the drive transistor via a first connecting portion, and a projection of a channel region of the fourth transistor on a base substrate and a projection of a channel region of the first transistor on the base substrate are located on different sides of a projection of the drive transistor on the base substrate.

2. The pixel drive circuit according to claim 1, wherein the light-emitting control circuit is used to connect the first power supply terminal and the second electrode of the drive transistor and to connect the first electrode of the light-emitting unit and the first electrode of the drive transistor in response to the signal of the enable signal terminal.

3. The pixel drive circuit according to claim 2, wherein the light-emitting control circuit comprises:

a fifth transistor having a first electrode connected to the first power supply terminal, a second electrode connected to the second node, and a gate connected to the enable signal terminal; and a sixth transistor having a first electrode connected to the first node, a second electrode connected to the first electrode of the light-emitting unit, and a gate connected to the enable signal terminal.

4. The pixel drive circuit according to claim 3, wherein the fifth transistor and the sixth transistor are P-type low temperature polysilicon transistors.

5. A driving method for the pixel drive circuit of claim 2, comprising: in a reset phase, turning on the first transistor and the second transistor to input an initial signal to the third node and the first electrode of the light-emitting unit through the initial signal terminal; in a compensation phase, turning on the first node and the third node by the compensation circuit, and at the same time writing a data signal to the first node by the data writing circuit; and in a light-emitting phase, connecting the first power supply terminal and an electrode of the drive transistor and connecting the first electrode of the light-emitting unit and another electrode of the drive transistor by the light-emitting control circuit.

6. The pixel drive circuit according to claim 1, wherein the pixel drive circuit is a part of a display panel.

7. A driving method for the pixel drive circuit of claim 1, comprising: in a reset phase, turning on the first transistor and the second transistor to input an initial signal to the third node and the first electrode of the light-emitting unit through the initial signal terminal; in a compensation phase, turning on the first node and the third node by the compensation circuit, and at the same time writing a data signal to the first node by the data writing circuit; and in a light-emitting phase, connecting the first power supply terminal and an electrode of the drive transistor and connecting the first electrode of the light-emitting unit and another electrode of the drive transistor by the light-emitting control circuit.

8. The pixel drive circuit according to claim 1, wherein the data writing circuit comprises a third transistor having a first electrode connected to the data signal terminal, a second electrode connected to the first node, and a gate connected to a first gate drive signal terminal.

9. The pixel drive circuit according to claim 8, wherein:

the fourth transistor has a first electrode connected to the second node, a second electrode connected to the third node, and a gate connected to a second gate drive signal terminal; and the third transistor is a P-type low-temperature polysilicon transistor, and the fourth transistor is an N-type oxide transistor.

10. The pixel drive circuit according to claim 8, wherein the compensation circuit comprises:

a fourth transistor having a first electrode connected to the second node, a second electrode connected to the third node, and a gate connected to the first gate drive signal terminal;

wherein the third transistor and the fourth transistor both are P-type low-temperature polysilicon transistors.

11. The pixel drive circuit according to claim 8, wherein the compensation circuit comprises:

a fourth transistor having a first electrode connected to the second node, a second electrode connected to the third node, and a gate connected to the first gate drive signal terminal wherein the third transistor and the fourth transistor both are N-type oxide transistors.

12. The pixel drive circuit according to claim 1, wherein the storage circuit comprises: a capacitor connected between the first power supply terminal and the third node.

13. A display panel, comprising:

the pixel drive circuit of claim 1;

a base substrate;

a first active layer located on a side of the base substrate and comprising a first active portion, the first active portion being used to form a channel region of the drive transistor;

a first conductive layer located on a side of the first active layer away from the base substrate, and comprising: a first conductive portion, an orthographic projection of which on the base substrate covers an orthographic projection of the first active portion on the base substrate, wherein the first conductive portion is used to form the gate of the drive transistor;

a second active layer located on a side of the first conductive layer away from the base substrate, and comprising:

a second active portion, an orthographic projection of which on the base substrate is located on a side of the orthographic projection of the first conductive portion on the base substrate in a first direction;

a third active portion, in the first direction, an orthographic projection of the third active portion on the base substrate being located between the orthographic projection of the first conductive portion on the base substrate and the orthographic projection of the second active portion on the base substrate, and on a side of the orthographic projection of the second active portion on the base substrate in a second direction, the first direction intersecting the second direction;

a fourth active portion connected between the second active portion and the third active portion, an orthographic projection of the fourth active portion on the base substrate being located on a side of the orthographic projection of the third active portion on the base substrate in a third direction, the second direction being opposite to the third direction, and in the first direction, the orthographic projection of the fourth active portion on the base substrate being located between the orthographic projection of the first conductive portion on the base substrate and the orthographic projection of the second active portion on the base substrate;

a fifth active portion connected to the second active portion, and an orthographic projection of the fifth active portion on the base substrate being located on a side of the orthographic projection of the second active portion on the base substrate in the first direction; and a sixth active portion connected to the third active portion, and an orthographic projection of the sixth active portion on the base substrate being located on a side of the orthographic projection of the third active portion on the base substrate in the second direction;

a second conductive layer disposed on a side of the second active layer away from the base substrate, and comprising:

a first grid line, an orthographic projection of which on the base substrate extends in the second direction, wherein the first grid line comprises a second conductive portion, and an orthographic projection of the second conductive portion on the base substrate and the orthographic projection of the second active portion on the base substrate overlap, and the second conductive portion is used to form a first gate of a second transistor;

a first protrusion connected to the first grid line, in the first direction, an orthographic projection of the first protrusion on the base substrate is located between the orthographic projection of the first grid line on the base substrate and the orthographic projection of the first conductive portion on the base substrate, the first protrusion comprises a third conductive portion, and an orthographic projection of the third conductive portion on the base substrate and the orthographic projection of the third active portion on the base substrate overlap so as to form a first gate of a first transistor;

a third conductive layer disposed on a side of the second conductive layer away from the base substrate, and comprising: a first connecting portion connecting the sixth active portion and the first conductive portion through a via hole; and an initial signal line, wherein an orthographic projection of the initial signal line on the base substrate extends in the second direction, the initial signal line is located on a side of the orthographic projection of the first grid line on the base substrate in the first direction, and the initial signal line is connected to the fifth active portion through a via hole.

14. The display panel of claim 13, wherein the data writing circuit comprises:

a third transistor having a first electrode connected to the data signal terminal, a second terminal connected to the first node, and a gate connected to a first gate drive signal terminal;

the compensation circuit comprises: a fourth transistor having a first electrode connected to the second node, a second electrode connected to the third node, and a gate connected to the first gate drive signal terminal; wherein the third transistor and the fourth transistor both are P-type low-temperature polysilicon transistors;

the first active layer further comprises:

a ninth active portion for forming a channel region of the third transistor, wherein an orthographic projection of the ninth active portion on the base substrate is located on a side of the orthographic projection of the first conductive portion on the base substrate in a fourth direction, and the fourth direction is opposite to the first direction; and a tenth active portion for forming a channel region of the fourth transistor, wherein an orthographic projection of the tenth active portion on the base substrate is located on a side of the orthographic projection of the first conductive portion on the base substrate in the fourth direction; and the first conductive layer further comprises: a fourth grid line for providing the first gate drive signal terminal, an orthographic projection of the fourth grid line on the base substrate extending in the second direction and covering the orthographic projections of the ninth active portion and the tenth active portion on the base substrate, a part of the fourth grid line being used to form a gate of the third transistor, and a part of the fourth grid line being used to form a gate of the fourth transistor.

15. The display panel of claim 14, further comprising:

a fifth conductive layer disposed on a side of the third conductive layer away from the base substrate, and comprising:

a first power cord for providing the first power supply terminal, an orthographic projection of the first power cord on the base substrate extending in the first direction, and the first power cord comprising a first edge;

a first shielding portion connected to the power cord, wherein the first shielding portion comprises a second edge connected to the first edge of the first power cord, and an angle between an orthographic projection of the first edge on the base substrate and an orthographic projection of the second edge on the base substrate is less than 180°, and an orthographic projection of the first shielding portion on the base substrate covers the orthographic projection of the third active portion on the base substrate; and a first data line for providing the data signal terminal, an orthographic projection of the first data line on the base substrate extending in the first direction, and the first data line comprising a third edge; and a second shielding portion connected to the data line, wherein the second shielding portion comprises a fourth edge connected to the third edge of the first data line, and an angle between an orthographic projection of the third edge on the base substrate and an orthographic projection of the fourth edge on the base substrate is less than 180°, and an orthographic projection of the second shielding portion on the base substrate covers the orthographic projection of the second active portion on the base substrate.

16. The display panel of claim 13, wherein the light-emitting control circuit comprises:

a fifth transistor having a first electrode connected to the first power supply terminal, a second electrode connected to the second node, and a gate connected to the enable signal terminal;

a sixth transistor having a first electrode connected to the first node, a second electrode connected to the first electrode of the light-emitting unit, and a gate connected to the enable signal terminal;

the first active layer further comprises:

a seventh active portion for forming a channel region of the fifth transistor, wherein in the first direction, an orthographic projection of the seventh active portion on the base substrate is located between the orthographic projection of the first conductive portion on the base substrate and the orthographic projection of the fourth active portion on the base substrate;

an eighth active portion for forming a channel region of the sixth transistor, wherein in the first direction, an orthographic projection of the eighth active portion on the base substrate is located between the orthographic projection of the first conductive portion on the base substrate and the orthographic projection of the fourth active portion on the base substrate;

the first conductive layer further comprises:

a third grid line for providing the enable signal terminal, an orthographic projection of the third grid line on the base substrate extending in the second direction and covering the orthographic projections of the seventh active portion and the eighth active portion on the base substrate, a part of the third grid line is used to form a gate of the fifth transistor, and a part of the third grid line is used to form a gate of the sixth transistor.

17. The display panel of claim 13, wherein the display panel further comprises:

a fourth conductive layer disposed between the first conductive layer and the second active layer, and comprising:

a second grid line, an orthographic projection of which on the base substrate extends in the second direction, wherein the second grid line comprises a fourth conductive portion, and the orthographic projection of the second active portion on the base substrate is located on an orthographic projection of the fourth conductive portion on the base substrate, and the fourth conductive portion is used to form a second gate of the second transistor; and a second protrusion connected to the second grid line, wherein in the first direction, an orthographic projection of the second protrusion on the base substrate is located between the orthographic projection of the second grid line on the base substrate and the orthographic projection of the first conductive portion on the base substrate, the second protrusion comprises a fifth conductive portion, and the orthographic projection of the third active portion on the base substrate is located on the orthographic projection of the fifth conductive portion on the base substrate, and the fifth conductive portion is used to form a second gate of the first transistor.

18. The display panel of claim 17, wherein the data writing circuit comprises:

a third transistor having a first electrode connected to the data signal terminal, a second electrode connected to the first node, and a gate data line connected to a first gate drive signal terminal;

the compensation circuit comprises: a fourth transistor having a first electrode connected to the second node, a second electrode connected to the third node, and a gate connected to a second gate drive signal terminal; wherein the third transistor is a P-type low-temperature polysilicon transistor, and the fourth transistor is an N-type oxide transistor;

the first active layer further comprises: an eleventh active portion for forming a channel region of the third transistor, wherein an orthographic projection of the eleventh active portion on the base substrate is located on a side of the orthographic projection of the first conductive portion on the base substrate in a fourth direction, and the fourth direction is opposite to the first direction;

the first conductive layer also comprises: a fifth grid line for providing the first gate drive signal terminal, an orthographic projection of the fifth grid line on the base substrate extending in the second direction and covering the orthographic projection of the eleventh active portion on the base substrate, and a part of the fifth grid line being used to form a gate of the third transistor;

the fourth conductive layer further comprises: a sixth grid line for providing the second gate drive signal terminal, an orthographic projection of the sixth grid line on the base substrate extending in the second direction and being located on a side of the orthographic projection of the fifth grid line on the base substrate in the fourth direction;

the second active layer also comprises:

a twelfth active portion for forming a first channel region of the fourth transistor, an orthographic projection of the twelfth active portion on the base substrate being located on the orthographic projection of the sixth grid line on the base substrate;

a thirteenth active portion for forming a second channel region of the fourth transistor, an orthographic projection of the thirteenth active portion on the base substrate being located on the orthographic projection of the sixth grid line on the base substrate; and a fourteenth active portion connected between the twelfth active portion and the thirteenth active portion, an orthographic projection of the fourteenth active portion on the base substrate being located on a side of the orthographic projection of the sixth grid line on the base substrate in the fourth direction; and the second conductive layer further comprises: a seventh grid line for providing the second gate drive signal terminal, an orthographic projection of the seventh grid line on the base substrate extending in the second direction and covering the orthographic projections of the twelfth active portion and the thirteenth active portion on the base substrate.

19. The display panel of claim 18, wherein a fifth conductive layer further comprises: a second power cord for providing the data signal terminal, an orthographic projection of the second power cord on the base substrate extending in the first direction and covering the orthographic projection of the fourteenth active portion on the base substrate.

20. The display panel of claim 19, wherein the second power cord comprises a fifth edge, and the fifth conductive layer further comprises:

a third shielding portion connected to the second power cord, wherein the third shielding portion comprises a sixth edge connected to the fifth edge of the second power cord, and an angle between an orthographic projection of the fifth edge on the base substrate and an orthographic projection of the sixth edge on the base substrate is less than 180°, and an orthographic projection of the third shielding portion on the base substrate covers the second active portion and the third active portion.

* * * * *